United States Patent
Eitan

(10) Patent No.: US 9,949,259 B2
(45) Date of Patent: Apr. 17, 2018

(54) SYSTEM AND METHOD FOR TRANSMITTING DATA PAYLOAD IN WB SC, AGGREGATE SC, DUPLICATE SC, OFDM TRANSMISSION FRAMES

(71) Applicant: QUALCOMM Incorporated, San Diego, CA (US)

(72) Inventor: Alecsander Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/137,861

(22) Filed: Apr. 25, 2016

(65) Prior Publication Data

US 2016/0330738 A1 Nov. 10, 2016

Related U.S. Application Data

(60) Provisional application No. 62/158,434, filed on May 7, 2015.

(51) Int. Cl.
*H04B 1/38* (2015.01)
*H04L 27/00* (2006.01)
(Continued)

(52) U.S. Cl.
CPC ....... *H04W 72/0446* (2013.01); *H04L 1/0079* (2013.01); *H04L 1/0083* (2013.01);
(Continued)

(58) Field of Classification Search
USPC ..... 375/219, 220, 222, 240, 240.26, 240.28, 375/254, 285, 284, 278, 295, 316, 346,
(Continued)

(56) References Cited

U.S. PATENT DOCUMENTS 8,019,060 B2 9/2011 Martino
2005/0286474 A1 12/2005 Van Zelst et al.
(Continued)

FOREIGN PATENT DOCUMENTS

EP 2860931 A1 4/2015
WO WO-2005018180 A1 2/2005
WO WO-2016167908 A1 10/2016

OTHER PUBLICATIONS

Eitan, A., et al., Qualcomm: "SC 64APSK for 11ay, 11-15-0339-00-ng60-sc-64apsk-for-11ay", IEEE Draft; 11-15-0339-00-NG60-SC-64APSK-FOR-11AY, IEEE-SA Mentor, Piscataway, NJ USA, vol. 802.11 NG60, Mar. 9, 2015 (Mar. 9, 2015), XP068082976, pp. 1-12. [retrieved on Mar. 9, 2015].

(Continued)

*Primary Examiner* — Linda Wong
(74) *Attorney, Agent, or Firm* — Loza & Loza, LLP/Qualcomm

(57) ABSTRACT

An apparatus for wireless communications is disclosed. The apparatus includes a processing system configured to generate a frame having a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol; and an interface configured to output the frame for transmission.

37 Claims, 29 Drawing Sheets

(51) Int. Cl.
| | |
|---|---|
| *H03K 9/00* | (2006.01) |
| *H04W 72/04* | (2009.01) |
| *H04L 12/24* | (2006.01) |
| *H04L 27/26* | (2006.01) |
| *H04L 1/00* | (2006.01) |
| *H04L 27/32* | (2006.01) |
| *H04L 5/00* | (2006.01) |

(52) U.S. Cl.
CPC .......... *H04L 1/0084* (2013.01); *H04L 27/261* (2013.01); *H04L 27/2602* (2013.01); *H04L 27/2646* (2013.01); *H04L 41/0896* (2013.01); *H04L 5/0044* (2013.01); *H04L 27/32* (2013.01)

(58) Field of Classification Search
USPC .......................... 375/347, 340, 299, 354, 356
See application file for complete search history.

(56) References Cited

U.S. PATENT DOCUMENTS

| | | | | |
|---|---|---|---|---|
| 2006/0280155 | A1* | 12/2006 | Kwon | H04W 74/0816 370/338 |
| 2007/0082696 | A1* | 4/2007 | Wang | H03M 13/271 455/550.1 |
| 2010/0002757 | A1* | 1/2010 | Birru | H04L 27/2657 375/226 |
| 2010/0260159 | A1 | 10/2010 | Zhang et al. | |
| 2011/0293040 | A1* | 12/2011 | Dupont | H03H 21/0018 375/316 |
| 2012/0236879 | A1* | 9/2012 | Oksman | H04B 3/54 370/474 |
| 2012/0263156 | A1 | 10/2012 | Abraham et al. | |
| 2013/0094552 | A1* | 4/2013 | Vedantham | H04B 1/38 375/222 |
| 2013/0157589 | A1 | 6/2013 | Shirakata et al. | |
| 2014/0362935 | A1* | 12/2014 | Porat | H04L 27/2602 375/260 |
| 2015/0030101 | A1 | 1/2015 | Zhang et al. | |
| 2015/0063255 | A1* | 3/2015 | Tandra | H04J 11/0023 370/329 |
| 2015/0168537 | A1* | 6/2015 | Amizur | G01S 5/021 455/456.2 |
| 2015/0288430 | A1* | 10/2015 | Giannakis | H04L 25/0206 375/267 |
| 2015/0304078 | A1* | 10/2015 | Cao | H04B 7/12 370/203 |
| 2015/0319782 | A1* | 11/2015 | Chu | H04W 74/08 370/336 |
| 2016/0227274 | A1* | 8/2016 | Oh | H04N 21/2362 |
| 2016/0234697 | A1* | 8/2016 | Azizi | H04W 4/008 |

OTHER PUBLICATIONS

Eitan, A., et al., QUALCOMM: "SC 64QAM for NG60 ; 11-15-0094-00-ng60-sc-64qam-for-ng60", IEEE Draft; 11-15-0094-00-NG60-SC-64QAM-FOR-NG60, IEEE-SA Mentor, Piscataway, NJ USA, vol. 802.11 NG60, Jan. 12, 2015 (Jan. 12, 2015), XP068082634, pp. 1-16. [retrieved on Jan. 12, 2015].

International Search Report and Written Opinion—PCT/US2016/029367—ISA/EPO—Aug. 12, 2016.

Lochan, V., et al., "WIFI on Steroids: 802.11 AC and 802.11 AD", IEEE Wireless Communications, IEEE Service Center, Piscataway, NJ, US, vol. 20, No. 6, Dec. 1, 2013 (Dec. 1, 2013 ), XP011536796, ISSN: 1536-1284, DOI: 10.1109/MWC.2013.6704471, pp. 30-35. [retrieved on Jan. 6, 2014].

QUALCOMM: "PHY Rate for NG60; 11-14-1378-00-ng60-phy-rate-for-ng60", IEEE Draft; 11-14-1378-00-NG60-PHY-RATE-FOR-NG60, IEEE-SA Mentor, Piscataway, NJ USA, vol. 802.11 NG60, Nov. 3, 2014 (Nov. 3, 2014), pp. 1-16, XP068071207, [retrieved on Nov. 3, 2014].

Texas Instruments: "WLAN Channel Bonding: Causing Greater Problems Than It Solves", Internet Citation, Sep. 2003 (Sep. 2003), XP002447539, Retrieved from the Internet: URL:http ://focus.ti.com/lit/m l/sply003/sply003.pdf[retrieved on Aug. 20, 2007].

* cited by examiner

GI VALUES FOR WB-SC

| # of channels | Symbol rate | FFT size | Long GI length | Normal GI length | Short GI length |
|---|---|---|---|---|---|
| 1 | 1.76 Gsps | 512 | 128 | 64 | 32 |
| 2 | 2*1.76 Gsps | 1024 | 256 | 128 | 64 |
| 3 | 3*1.76 Gsps | 1536 | 384 | 192 | 96 |
| 4 | 4*1.76 Gsps | 2048 | 512 | 256 | 128 |

GI VALUES FOR WB-SC

| # of channels | Symbol rate | FFT size | Long GI Delay spread | Normal GI Delay spread | Short GI Delay spread |
|---|---|---|---|---|---|
| 1 | 1.76 Gsps | 512 | 72ns | 36ns | 18ns |
| 2 | 2*1.76 Gsps | 1024 | 72ns | 36ns | 18ns |
| 3 | 3*1.76 Gsps | 1536 | 72ns | 36ns | 18ns |
| 4 | 4*1.76 Gsps | 2048 | 72ns | 36ns | 18ns |

| MCS INDEX | MODULATION | $N_{CBPS}$ | REPETITION | CODE RATE | DATA RATES | | | | | | | | | | | | |
|---|---|---|---|---|---|---|---|---|---|---|---|---|---|---|---|---|---|
| | | | | | 1 CH | | | 2 CH | | | 3 CH | | | 4 CH | | | |
| | | | | | LONG GI | NORMAL GI | SHORT GI | LONG GI | NORMAL GI | SHORT GI | LONG GI | NORMAL GI | SHORT GI | LONG GI | NORMAL GI | SHORT GI | |
| 1 | π/2-BPSK | 1 | 2 | 1/2 | 330 | 385 | 412.5 | 660 | 770 | 825 | 990 | 1155 | 1237.5 | 1320 | 1540 | 1650 | |
| 2 | π/2-BPSK | 1 | 1 | 1/2 | 660 | 770 | 825 | 1320 | 1540 | 1650 | 1980 | 2310 | 2475 | 2640 | 3080 | 3300 | |
| 3 | π/2-BPSK | 1 | 1 | 5/8 | 825 | 962.5 | 1031.25 | 1650 | 1925 | 2062.5 | 2475 | 2887.5 | 3093.5 | 3300 | 3850 | 4125 | |
| 4 | π/2-BPSK | 1 | 1 | 3/4 | 990 | 1155 | 1237.5 | 1980 | 2310 | 2475 | 2970 | 3465 | 3712.5 | 3960 | 4620 | 4950 | |
| 5 | π/2-BPSK | 1 | 1 | 13/16 | 1072.5 | 1251.25 | 1340.63 | 2145 | 2502.5 | 2681.88 | 3217.5 | 3753.75 | 4021.88 | 4290 | 5005 | 5362.5 | |
| 6 | π/2-QPSK | 2 | 1 | 1/2 | 1320 | 1540 | 1650 | 2640 | 3080 | 3300 | 3960 | 4620 | 4950 | 5280 | 6160 | 6600 | |
| 7 | π/2-QPSK | 2 | 1 | 5/8 | 1650 | 1925 | 2062.5 | 3300 | 3850 | 4125 | 4950 | 5775 | 6187.5 | 6600 | 7700 | 8250 | |
| 8 | π/2-QPSK | 2 | 1 | 3/4 | 1980 | 2310 | 2475 | 3960 | 4620 | 4950 | 5940 | 6930 | 7425 | 7920 | 9240 | 9900 | |
| 9 | π/2-QPSK | 2 | 1 | 13/16 | 2145 | 2502.5 | 2681.25 | 4290 | 5005 | 5362.5 | 6435 | 7507.5 | 8043.75 | 8580 | 10010 | 10725 | |
| 10 | π/2-QPSK | 2 | 1 | 7/8 | 2310 | 2695 | 2887.5 | 4620 | 5390 | 5775 | 6930 | 8085 | 8662.5 | 9240 | 10780 | 11550 | |
| 11 | π/2-16QAM | 4 | 1 | 1/2 | 2640 | 3080 | 3300 | 5280 | 6160 | 6600 | 7920 | 9240 | 9900 | 10560 | 12320 | 13200 | |
| 12 | π/2-16QAM | 4 | 1 | 5/8 | 3300 | 3850 | 4125 | 6600 | 7700 | 8250 | 9900 | 11550 | 12375 | 13200 | 15400 | 16500 | |
| 13 | π/2-16QAM | 4 | 1 | 3/4 | 3960 | 4620 | 4950 | 7920 | 9240 | 9900 | 11880 | 13860 | 14850 | 15840 | 18480 | 19800 | |
| 14 | π/2-16QAM | 4 | 1 | 13/16 | 4290 | 5005 | 5362.5 | 8580 | 10010 | 10725 | 12870 | 15015 | 16087.5 | 17160 | 20020 | 21450 | |
| 15 | π/2-16QAM | 4 | 1 | 7/8 | 4620 | 5390 | 5775 | 9240 | 10780 | 11550 | 13860 | 16170 | 17325 | 18480 | 21560 | 23100 | |
| 16 | π/2-64QAM | 6 | 1 | 5/8 | 4950 | 5775 | 6187.5 | 9900 | 11550 | 12375 | 14850 | 17325 | 18562.5 | 19800 | 23100 | 24750 | |
| 17 | π/2-64QAM | 6 | 1 | 3/4 | 5940 | 6930 | 7425 | 11880 | 13860 | 14850 | 17820 | 20790 | 22275 | 23760 | 27720 | 29700 | |
| 18 | π/2-64QAM | 6 | 1 | 13/16 | 6435 | 7507.5 | 8043.75 | 12870 | 15015 | 16087.5 | 19305 | 22522.5 | 24131.25 | 25740 | 30030 | 32175 | |
| 19 | π/2-64QAM | 6 | 1 | 7/8 | 8085 | 9432.5 | 10106.25 | 16170 | 18865 | 20212.5 | 24255 | 28297.5 | 30318.75 | 32340 | 37730 | 40425 | |
| 20 | π/2-64APSK | 6 | 1 | 5/8 | 4950 | 5775 | 6187.5 | 9900 | 11550 | 12375 | 14850 | 17325 | 18562.5 | 19800 | 23100 | 24750 | |
| 21 | π/2-64APSK | 6 | 1 | 3/4 | 5940 | 6930 | 7425 | 11880 | 13860 | 14850 | 17820 | 20790 | 22275 | 23760 | 27720 | 29700 | |
| 22 | π/2-64APSK | 6 | 1 | 13/16 | 6435 | 7507.5 | 8043.75 | 12870 | 15015 | 16087.5 | 19305 | 22522.5 | 24131.25 | 25740 | 30030 | 32175 | |
| 23 | π/2-64APSK | 6 | 1 | 7/8 | 6930 | 8085 | 8662.5 | 13860 | 16170 | 17325 | 20790 | 24255 | 25987.5 | 27720 | 32340 | 34650 | |
| 24 | π/2-128APSK | 7 | 1 | 3/4 | 6930 | 8085 | 9384.38 | 13860 | 16170 | 17325 | 20790 | 24255 | 25987.5 | 27720 | 32340 | 34650 | |
| 25 | π/2-128APSK | 7 | 1 | 13/16 | 7507.5 | 8758.75 | 10106.25 | 15015 | 17517.5 | 18768.75 | 22522.5 | 26276.25 | 28153.25 | 30030 | 35035 | 37537.5 | |
| 26 | π/2-128APSK | 7 | 1 | 7/8 | 8085 | 9432.5 | 10106.25 | 16170 | 18865 | 20212.5 | 24255 | 28297.5 | 30318.75 | 32340 | 37730 | 40425 | |
| 27 | π/2-256QAM | 8 | 1 | 3/4 | 7920 | 9240 | 9900 | 15840 | 18480 | 19800 | 23760 | 27720 | 29700 | 31680 | 36960 | 39600 | |
| 28 | π/2-256QAM | 8 | 1 | 13/16 | 8580 | 10010 | 10725 | 17160 | 20020 | 21450 | 25740 | 30030 | 32175 | 34320 | 40040 | 42900 | |
| 29 | π/2-256QAM | 8 | 1 | 7/8 | 9240 | 10780 | 11550 | 18480 | 21560 | 23100 | 27720 | 32340 | 34650 | 36960 | 43120 | 46200 | |
| 30 | π/2-256APSK | 8 | 1 | 3/4 | 7920 | 9240 | 9900 | 15840 | 18480 | 19800 | 23760 | 27720 | 29700 | 31680 | 36960 | 39600 | |
| 31 | π/2-256APSK | 8 | 1 | 13/16 | 8580 | 10010 | 10725 | 17160 | 20020 | 21450 | 25740 | 30030 | 32175 | 34320 | 40040 | 42900 | |
| 32 | π/2-256APSK | 8 | 1 | 7/8 | 9240 | 10780 | 11550 | 18480 | 21560 | 23100 | 27720 | 32340 | 34650 | 36960 | 43120 | 46200 | |

FIG. 5

64APSK1 CONSTELLATION

PHASE DEFINITIONS FOR 64APSK1

| label | Radius | $\phi/\pi$ p=q=0 | $\phi/\pi$ p=0,q=1 | $\phi/\pi$ p=1,q=0 | $\phi/\pi$ p=q=1 |
|---|---|---|---|---|---|
| 0000pq | R4 | 1/4 | 7/4 | 3/4 | 5/4 |
| 0001pq | R4 | 13/28 | 43/28 | 15/28 | 41/28 |
| 0010pq | R4 | 1/28 | 55/28 | 27/28 | 29/28 |
| 0011pq | R1 | 1/4 | 7/4 | 3/4 | 5/4 |
| 0100pq | R4 | 9/28 | 47/28 | 19/28 | 37/28 |
| 0101pq | R4 | 11/28 | 45/28 | 17/28 | 39/28 |
| 0110pq | R3 | 1/20 | 39/20 | 19/20 | 21/20 |
| 0111pq | R2 | 1/12 | 23/12 | 11/12 | 13/12 |
| 1000pq | R4 | 5/28 | 51/28 | 23/28 | 33/28 |
| 1001pq | R3 | 9/20 | 31/20 | 11/20 | 29/20 |
| 1010pq | R4 | 3/28 | 53/28 | 25/28 | 31/28 |
| 1011pq | R2 | 5/12 | 19/12 | 7/12 | 17/12 |
| 1100pq | R3 | 1/4 | 7/4 | 3/4 | 5/4 |
| 1101pq | R3 | 7/20 | 33/20 | 13/20 | 27/20 |
| 1110pq | R3 | 3/20 | 37/20 | 17/20 | 23/20 |
| 1111pq | R2 | 1/4 | 7/4 | 3/4 | 5/4 |

R2/R1=2.4   R3/R1=4.3   R4/R1=7.0

PHASE DEFINITIONS FOR 64APSK2

| label | Radius | $\phi/\pi$ $p=q=0$ | $\phi/\pi$ $p=0,q=1$ | $\phi/\pi$ $p=1,q=0$ | $\phi/\pi$ $p=q=1$ |
|---|---|---|---|---|---|
| p0q000 | R2 | 25/16 | 23/16 | 7/16 | 9/16 |
| p0q001 | R4 | 7/4 | 5/4 | 1/4 | 3/4 |
| p0q010 | R2 | 27/16 | 21/16 | 5/16 | 11/16 |
| p0q011 | R3 | 7/4 | 5/4 | 1/4 | 3/4 |
| p0q100 | R4 | 31/20 | 29/20 | 9/20 | 11/20 |
| p0q101 | R4 | 33/20 | 27/20 | 7/20 | 13/20 |
| p0q110 | R3 | 31/20 | 29/20 | 9/20 | 11/20 |
| p0q111 | R3 | 33/20 | 27/20 | 7/20 | 13/20 |
| p1q000 | R1 | 13/8 | 11/8 | 3/8 | 5/8 |
| p1q001 | R4 | 37/20 | 23/20 | 3/20 | 17/20 |
| p1q010 | R2 | 29/16 | 19/16 | 3/16 | 13/16 |
| p1q011 | R3 | 37/20 | 23/20 | 3/20 | 17/20 |
| p1q100 | R1 | 15/8 | 9/8 | 1/8 | 7/8 |
| p1q101 | R4 | 39/20 | 21/20 | 1/20 | 19/20 |
| p1q110 | R2 | 31/16 | 17/16 | 1/16 | 15/16 |
| p1q111 | R3 | 39/20 | 21/20 | 1/20 | 19/20 |

R2/R1=2.2   R3/R1=3.6   R4/R1=5.0         FIG. 8B

PHASE DEFINITIONS FOR 128APSK

| label | Radius | $\phi/\pi$ p=q=0 | $\phi/\pi$ p=0,q=1 | $\phi/\pi$ p=1,q=0 | $\phi/\pi$ p=q=1 |
|---|---|---|---|---|---|
| qp00000 | R1 | 83/1260 | 2437/1260 | 1177/1260 | 1343/1260 |
| qp00001 | R6 | 11/105 | 199/105 | 94/105 | 116/105 |
| qp00010 | R6 | 37/1680 | 3323/1680 | 1643/1680 | 1717/1680 |
| qp00011 | R6 | 11/168 | 325/168 | 157/168 | 179/168 |
| qp00100 | R2 | 121/2520 | 4919/2520 | 2399/2520 | 2641/2520 |
| qp00101 | R3 | 23/280 | 537/280 | 257/280 | 303/280 |
| qp00110 | R5 | 19/720 | 1421/720 | 701/720 | 739/720 |
| qp00111 | R4 | 61/720 | 1379/720 | 659/720 | 781/720 |
| qp01000 | R1 | 103/560 | 1017/560 | 457/560 | 663/560 |
| qp01001 | R6 | 61/420 | 779/420 | 359/420 | 481/420 |
| qp01010 | R6 | 383/1680 | 2977/1680 | 1297/1680 | 2063/1680 |
| qp01011 | R6 | 929/5040 | 9151/5040 | 4111/5040 | 5969/5040 |
| qp01100 | R2 | 113/560 | 1007/560 | 447/560 | 673/560 |
| qp01101 | R3 | 169/1008 | 1847/1008 | 839/1008 | 1177/1008 |
| qp01110 | R5 | 563/2520 | 4477/2520 | 1957/2520 | 3083/2520 |
| qp01111 | R4 | 139/840 | 1541/840 | 701/840 | 979/840 |
| qp10000 | R1 | 243/560 | 877/560 | 317/560 | 803/560 |
| qp10001 | R6 | 1993/5040 | 8087/5040 | 3047/5040 | 7033/5040 |
| qp10010 | R6 | 43/90 | 137/90 | 47/90 | 133/90 |
| qp10011 | R6 | 73/168 | 263/168 | 95/168 | 241/168 |
| qp10100 | R2 | 1139/2520 | 3901/2520 | 1381/2520 | 3659/2520 |
| qp10101 | R3 | 117/280 | 443/280 | 163/280 | 397/280 |
| qp10110 | R5 | 341/720 | 1099/720 | 379/720 | 1061/720 |
| qp10111 | R4 | 349/840 | 1331/840 | 491/840 | 1189/840 |
| qp11000 | R1 | 177/560 | 943/560 | 383/560 | 737/560 |
| qp11001 | R6 | 1789/5040 | 8291/5040 | 3251/5040 | 6829/5040 |
| qp11010 | R6 | 49/180 | 311/180 | 131/180 | 229/180 |
| qp11011 | R6 | 53/168 | 283/168 | 115/168 | 221/168 |
| qp11100 | R2 | 167/560 | 953/560 | 393/560 | 727/560 |
| qp11101 | R3 | 239/720 | 1201/720 | 481/720 | 959/720 |
| qp11110 | R5 | 199/720 | 1241/720 | 521/720 | 919/720 |
| qp11111 | R4 | 281/840 | 1399/840 | 559/840 | 1121/840 |

256APSK CONSTELLATION

LABELS DEFINITION FOR 256 APSK

| label | radius |
|---|---|
| 000qpaaa | R1 |
| 001qpaaa | R2 |
| 010qpaaa | R4 |
| 011qpaaa | R3 |
| 100qpaaa | R8 |
| 101qpaaa | R7 |
| 110qpaaa | R5 |
| 111qpaaa | R6 |

PHASE DEFINITIONS FOR 256APSK

| label | $\phi/\pi$ | $\phi/\pi$ | $\phi/\pi$ | $\phi/\pi$ |
|---|---|---|---|---|
| | p=q=0 | p=0,q=1 | p=1,q=0 | p=q=1 |
| mqp000 | $\phi_1 = 1\pi/32$ | $-\phi_1$ | $\pi-\phi_1$ | $\pi+\phi_1$ |
| mqp001 | $\phi_2 = 3\pi/32$ | $-\phi_2$ | $\pi-\phi_2$ | $\pi+\phi_2$ |
| mqp010 | $\phi_3 = 7\pi/32$ | $-\phi_3$ | $\pi-\phi_3$ | $\pi+\phi_3$ |
| mqp011 | $\phi_4 = 5\pi/32$ | $-\phi_4$ | $\pi-\phi_4$ | $\pi+\phi_4$ |
| mqp100 | $\phi_5 = 15\pi/32$ | $-\phi_5$ | $\pi-\phi_5$ | $\pi+\phi_5$ |
| mqp101 | $\phi_6 = 13\pi/32$ | $-\phi_6$ | $\pi-\phi_6$ | $\pi+\phi_6$ |
| mqp110 | $\phi_7 = 9\pi/32$ | $-\phi_7$ | $\pi-\phi_7$ | $\pi+\phi_7$ |
| mqp111 | $\phi_8 = 11\pi/32$ | $-\phi_8$ | $\pi-\phi_8$ | $\pi+\phi_8$ |

SPECTRUM MASK CORNERS

| Corner | Relative power (dBc) | 1 CH (11ad) | 2 CH | 3 CH | 4 CH | Dominated by: |
|---|---|---|---|---|---|---|
| 1 | 0 | 0.94 | 2.02 | 3.1 | 4.18 | Aggregate-SC & OFDM |
| 2 | -17 | 1.2 | 2.4 | 3.6 | 4.8 | WB-SC |
| 3 | -22 | 2.7 | 5.4 | 8.1 | 10.8 | WB-SC |
| 4 | -30 | 3.06 | 6.12 | 9.18 | 12.24 | WB-SC |

Values in the table are in GHz

FIG. 16A

| CASE: CHANNEL SPACING = 420 | | | | | | | |
|---|---|---|---|---|---|---|---|
| CB=1 (FOR EACH CH1-4) | | CB=2 (FOR EACH CH1-2, CH2-3, CH3-4) | | CB=3 (FOR EACH CH1-2-3, CH2-3-4) | | CB=4 (FOR CH1-2-3-4) | |
| (-) Pilot Index | (+) Pilot Index | (-) Pilot Index | (+) Pilot Index | (-) Pilot Index | (+) Pilot Index | (-) Pilot Index | (+) Pilot Index |
| -158 | 10 | -368 | 10 | -578 | 10 | -788 | 10 |
| -137 | 31 | -347 | 31 | -557 | 31 | -767 | 31 |
| -116 | 52 | -326 | 52 | -536 | 52 | -746 | 52 |
| -95 | 73 | -305 | 73 | -515 | 73 | -725 | 73 |
| -74 | 94 | -284 | 94 | -494 | 94 | -704 | 94 |
| -53 | 115 | -263 | 115 | -473 | 115 | -683 | 115 |
| -32 | 136 | -242 | 136 | -452 | 136 | -662 | 136 |
| -11 | 157 | -221 | 157 | -431 | 157 | -641 | 157 |
| | | -200 | 178 | -410 | 178 | -620 | 178 |
| | | -179 | 199 | -389 | 199 | -599 | 199 |
| | | -158 | 220 | -368 | 220 | -578 | 220 |
| | | -137 | 241 | -347 | 241 | -557 | 241 |
| | | -116 | 262 | -326 | 262 | -536 | 262 |
| | | -95 | 283 | -305 | 283 | -515 | 283 |
| | | -74 | 304 | -284 | 304 | -494 | 304 |
| | | -53 | 325 | -263 | 325 | -473 | 325 |
| | | -32 | 346 | -242 | 346 | -452 | 346 |
| | | -11 | 367 | -221 | 367 | -431 | 367 |
| | | | | -200 | 388 | -410 | 388 |
| | | | | -179 | 409 | -389 | 409 |
| | | | | -158 | 430 | -368 | 430 |
| | | | | -137 | 451 | -347 | 451 |
| | | | | -116 | 472 | -326 | 472 |
| | | | | -95 | 493 | -305 | 493 |
| | | | | -74 | 514 | -284 | 514 |
| | | | | -53 | 535 | -263 | 535 |
| | | | | -32 | 556 | -242 | 556 |
| | | | | -11 | 577 | -221 | 577 |
| | | | | | | -200 | 598 |
| | | | | | | -179 | 619 |
| | | | | | | -158 | 640 |
| | | | | | | -137 | 661 |
| | | | | | | -116 | 682 |
| | | | | | | -95 | 703 |
| | | | | | | -74 | 724 |
| | | | | | | -53 | 745 |
| | | | | | | -32 | 766 |
| | | | | | | -11 | 787 |

FIG. 16B

| CASE: CHANNEL SPACING = 418 | | | | | | | |
|---|---|---|---|---|---|---|---|
| CB=1 (FOR EACH CH1-4) | | CB=2 (FOR EACH CH1-2, CH2-3, CH3-4) | | CB=3 (FOR EACH CH1-2-3, CH2-3-4) | | CB=4 (FOR CH1-2-3-4) | |
| (-) Pilot Index | (+) Pilot Index | (-) Pilot Index | (+) Pilot Index | (-) Pilot Index | (+) Pilot Index | (-) Pilot Index | (+) Pilot Index |
| -161 | 10 | -370 | 10 | -579 | 10 | -788 | 10 |
| -142 | 29 | -351 | 29 | -560 | 29 | -769 | 29 |
| -123 | 48 | -332 | 48 | -541 | 48 | -750 | 48 |
| -104 | 67 | -313 | 67 | -522 | 67 | -731 | 67 |
| -85 | 86 | -294 | 86 | -503 | 86 | -712 | 86 |
| -66 | 105 | -275 | 105 | -484 | 105 | -693 | 105 |
| -47 | 124 | -256 | 124 | -465 | 124 | -674 | 124 |
| -28 | 143 | -237 | 143 | -446 | 143 | -655 | 143 |
| -9 | 162 | -218 | 162 | -427 | 162 | -636 | 162 |
| | | -199 | 181 | -408 | 181 | -617 | 181 |
| | | -180 | 200 | -389 | 200 | -598 | 200 |
| | | -161 | 219 | -370 | 219 | -579 | 219 |
| | | -142 | 238 | -351 | 238 | -560 | 238 |
| | | -123 | 257 | -332 | 257 | -541 | 257 |
| | | -104 | 276 | -313 | 276 | -522 | 276 |
| | | -85 | 295 | -294 | 295 | -503 | 295 |
| | | -66 | 314 | -275 | 314 | -484 | 314 |
| | | -47 | 333 | -256 | 333 | -465 | 333 |
| | | -28 | 352 | -237 | 352 | -446 | 352 |
| | | -9 | 371 | -218 | 371 | -427 | 371 |
| | | | | -199 | 390 | -408 | 390 |
| | | | | -180 | 409 | -389 | 409 |
| | | | | -161 | 428 | -370 | 428 |
| | | | | -142 | 447 | -351 | 447 |
| | | | | -123 | 466 | -332 | 466 |
| | | | | -104 | 485 | -313 | 485 |
| | | | | -85 | 504 | -294 | 504 |
| | | | | -66 | 523 | -275 | 523 |
| | | | | -47 | 542 | -256 | 542 |
| | | | | -28 | 561 | -237 | 561 |
| | | | | -9 | 580 | -218 | 580 |
| | | | | | | -199 | 599 |
| | | | | | | -180 | 618 |
| | | | | | | -161 | 637 |
| | | | | | | -142 | 656 |
| | | | | | | -123 | 675 |
| | | | | | | -104 | 694 |
| | | | | | | -85 | 713 |
| | | | | | | -66 | 732 |
| | | | | | | -47 | 751 |
| | | | | | | -28 | 770 |
| | | | | | | -9 | 789 |

FIG. 16C

| CASE: CHANNEL SPACING = 419 | | | | | | | |
|---|---|---|---|---|---|---|---|
| CB=1 CH1 | | CB=1 CH2 | | CB=1 CH3 | | CB=1 CH4 | |
| (-) Pilot Index | (+) Pilot Index | (-) Pilot Index | (+) Pilot Index | (-) Pilot Index | (+) Pilot Index | (-) Pilot Index | (+) Pilot Index |
| -162 | 6 | -161 | 7 | -160 | 8 | -159 | 9 |
| -141 | 27 | -140 | 28 | -139 | 29 | -138 | 30 |
| -120 | 48 | -119 | 49 | -118 | 50 | -117 | 51 |
| -99 | 69 | -98 | 70 | -97 | 71 | -96 | 72 |
| -78 | 90 | -77 | 91 | -76 | 92 | -75 | 93 |
| -57 | 111 | -56 | 112 | -55 | 113 | -54 | 114 |
| -36 | 132 | -35 | 133 | -34 | 134 | -33 | 135 |
| -15 | 153 | -14 | 154 | -13 | 155 | -12 | 156 |
|  | 174 |  | 175 |  | 176 |  | 177 |

FIG. 16D1

| CASE: CHANNEL SPACING = 419 | | | | | |
|---|---|---|---|---|---|
| CB=2 CH1-2 | | CB=2 CH2-3 | | CB=2 CH3-4 | |
| (-) Pilot Index | (+) Pilot Index | (-) Pilot Index | (+) Pilot Index | (-) Pilot Index | (+) Pilot Index |
| -372 | 6 | -370 | 8 | -379 | 9 |
| -351 | 27 | -349 | 29 | -348 | 30 |
| -330 | 48 | -328 | 50 | -327 | 51 |
| -309 | 69 | -307 | 71 | -306 | 72 |
| -288 | 90 | -286 | 92 | -285 | 93 |
| -267 | 111 | -265 | 113 | -264 | 114 |
| -246 | 132 | -244 | 134 | -243 | 135 |
| -225 | 153 | -223 | 155 | -222 | 156 |
| -204 | 174 | -202 | 176 | -201 | 177 |
| -183 | 195 | -181 | 197 | -180 | 198 |
| -162 | 216 | -160 | 218 | -159 | 219 |
| -141 | 237 | -139 | 239 | -138 | 240 |
| -120 | 258 | -118 | 260 | -117 | 261 |
| -99 | 279 | -97 | 281 | -96 | 282 |
| -78 | 300 | -76 | 302 | -75 | 303 |
| -57 | 321 | -55 | 323 | -54 | 324 |
| -36 | 342 | -34 | 344 | -33 | 345 |
| -15 | 363 | -13 | 365 | -12 | 366 |
|  | 384 |  | 386 |  | 387 |

FIG. 16D2

| CASE: CHANNEL SPACING = 419 ||||
|---|---|---|---|
| CB=3 CH1-2-3 || CB=3 CH2-3-4 ||
| (−) Pilot Index | (+) Pilot Index | (−) Pilot Index | (+) Pilot Index |
| −581 | 7 | −580 | 8 |
| −560 | 28 | −559 | 29 |
| −539 | 49 | −538 | 50 |
| −518 | 70 | −517 | 71 |
| −497 | 91 | −496 | 92 |
| −476 | 112 | −475 | 113 |
| −455 | 133 | −454 | 134 |
| −434 | 154 | −433 | 155 |
| −413 | 175 | −412 | 176 |
| −392 | 196 | −391 | 197 |
| −371 | 217 | −370 | 218 |
| −350 | 238 | −349 | 239 |
| −329 | 259 | −328 | 260 |
| −308 | 280 | −307 | 281 |
| −287 | 301 | −286 | 302 |
| −266 | 322 | −265 | 323 |
| −245 | 343 | −244 | 344 |
| −224 | 364 | −223 | 365 |
| −203 | 385 | −202 | 386 |
| −182 | 406 | −181 | 407 |
| −161 | 427 | −160 | 428 |
| −140 | 448 | −139 | 449 |
| −119 | 469 | −118 | 470 |
| −98 | 490 | −97 | 491 |
| −77 | 511 | −76 | 512 |
| −56 | 532 | −55 | 533 |
| −35 | 553 | −34 | 554 |
| −14 | 574 | −13 | 575 |
|  | 595 |  | 596 |

FIG. 16D3

| CASE: CHANNEL SPACING = 419 ||
|---|---|
| CB=4 CH1-2-3-4 ||
| (-) Pilot Index | (+) Pilot Index |
| -790 | 8 |
| -769 | 29 |
| -748 | 50 |
| -727 | 71 |
| -706 | 92 |
| -685 | 113 |
| -664 | 134 |
| -643 | 155 |
| -622 | 176 |
| -601 | 197 |
| -580 | 218 |
| -559 | 239 |
| -538 | 260 |
| -517 | 281 |
| -496 | 302 |
| -475 | 323 |
| -454 | 344 |
| -433 | 365 |
| -412 | 386 |
| -391 | 407 |
| -370 | 428 |
| -349 | 449 |
| -328 | 470 |
| -307 | 491 |
| -286 | 512 |
| -265 | 533 |
| -244 | 554 |
| -223 | 575 |
| -202 | 596 |
| -181 | 617 |
| -160 | 638 |
| -139 | 659 |
| -118 | 680 |
| -97 | 701 |
| -76 | 722 |
| -55 | 743 |
| -34 | 764 |
| -13 | 785 |
|  | 806 |

SYSTEM AND METHOD FOR TRANSMITTING DATA PAYLOAD IN WB SC, AGGREGATE SC, DUPLICATE SC, OFDM TRANSMISSION FRAMES

CROSS-REFERENCE TO A RELATED APPLICATION

This application claims the benefit of the filing date of Provisional Application, Ser. No. 62/158,434, filed on May 7, 2015, and entitled, "Data Payload Format for OFDM WB SC, Aggregate SC, and Duplicate SC Transmission Frames," which is incorporated herein by reference.

FIELD

Certain aspects of the present disclosure generally relate to wireless communications and, more particularly, to a data payload format for wideband single carrier (WB SC), aggregate SC, duplicate SC, and orthogonal frequency division multiplexing (OFDM) transmission frames.

BACKGROUND

In order to address the issue of increasing bandwidth requirements demanded for wireless communications systems, different schemes are being developed. In some schemes, data is wireless transmitted at high data rates (e.g., several Gigabits/s) over one or more channels in the 60 GHz range.

SUMMARY

Certain aspects of the present disclosure provide an apparatus for wireless communications. The apparatus comprises a processing system configured to generate a frame comprising a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol; and an interface configured to output the frame for transmission.

Certain aspects of the present disclosure provide a method for wireless communications. The method comprises generating a frame comprising a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol; and outputting the frame for transmission.

Certain aspects of the present disclosure provide an apparatus for wireless communications. The apparatus comprises means for generating a frame comprising a preamble, a header, and a data payload, wherein the preamble, the header, and the data payload are decodable by a first device when operating according to a first protocol, wherein the preamble and the header decodable by a second device when operating according to a second protocol, the data payload not being decodable by the second device when operating according to the second protocol; and means for outputting the frame for transmission.

Certain aspects of the present disclosure provide a computer readable medium having instructions stored thereon for generating a frame comprising a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol; and outputting the frame for transmission.

Certain aspects of the present disclosure provide a wireless node. The wireless node comprises at least one antenna; a processing system configured to generate a frame comprising a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol; and an interface configured to output the frame for transmission via the at least one antenna.

BRIEF DESCRIPTION OF THE DRAWINGS

FIG. 5 illustrate a table depicting data rates associated with exemplary modulation coding schemes (MCS) for transmitting data via a single-channel single carrier (SC) transmission mode, wideband single carrier (WB-SC) transmission mode, and aggregate single carrier (SC) transmission mode in accordance with certain aspects of the present disclosure.

FIGS. 8A-8B illustrate a constellation diagram and phase definition table for converting data bits into data symbols (or vice-versa) pursuant to a second version of a 64 amplitude phase-shift keying (64APSK) modulation in accordance with another aspect of the present disclosure.

FIGS. 9A-9B illustrate a constellation diagram and phase definition table for converting data bits into data symbols (or vice-versa) pursuant to a 128 amplitude phase-shift keying (128APSK) modulation in accordance with another aspect of the present disclosure.

FIGS. 11A-11C illustrate a constellation diagram, labels definition table, and phase definition table for converting data bits into data symbols (or vice-versa) pursuant to a 256 amplitude phase-shift keying (256APSK) modulation in accordance with another aspect of the present disclosure.

FIG. 16A illustrates a table of exemplary parameters associated with an OFDM transmission mode in accordance with another aspect of the present disclosure.

FIG. 16B illustrate a table of an exemplary pilot subcarrier assignment for a 420 subcarrier channel spacing associated with an orthogonal frequency division multiplexing (OFDM) transmission mode in accordance with another aspect of the present disclosure.

FIG. 16C illustrate a table of an exemplary pilot subcarrier assignment for a 418 subcarrier channel spacing associated with an orthogonal frequency division multiplexing (OFDM) transmission mode in accordance with another aspect of the present disclosure.

FIGS. 16D1-16D4 illustrate tables of exemplary pilot subcarrier assignments for a 419 subcarrier channel spacing for single-channel, two-bonded channel, three-bonded channel, and four-bonded channel cases associated with an orthogonal frequency division multiplexing (OFDM) transmission mode in accordance with another aspect of the present disclosure.

FIG. 16E illustrate a table depicting data rates associated with exemplary available modulation coding schemes (MCS) for transmitting data via an orthogonal frequency division multiplexing (OFDM) transmission mode in accordance with certain aspects of the present disclosure.

DETAILED DESCRIPTION

Figure 1:
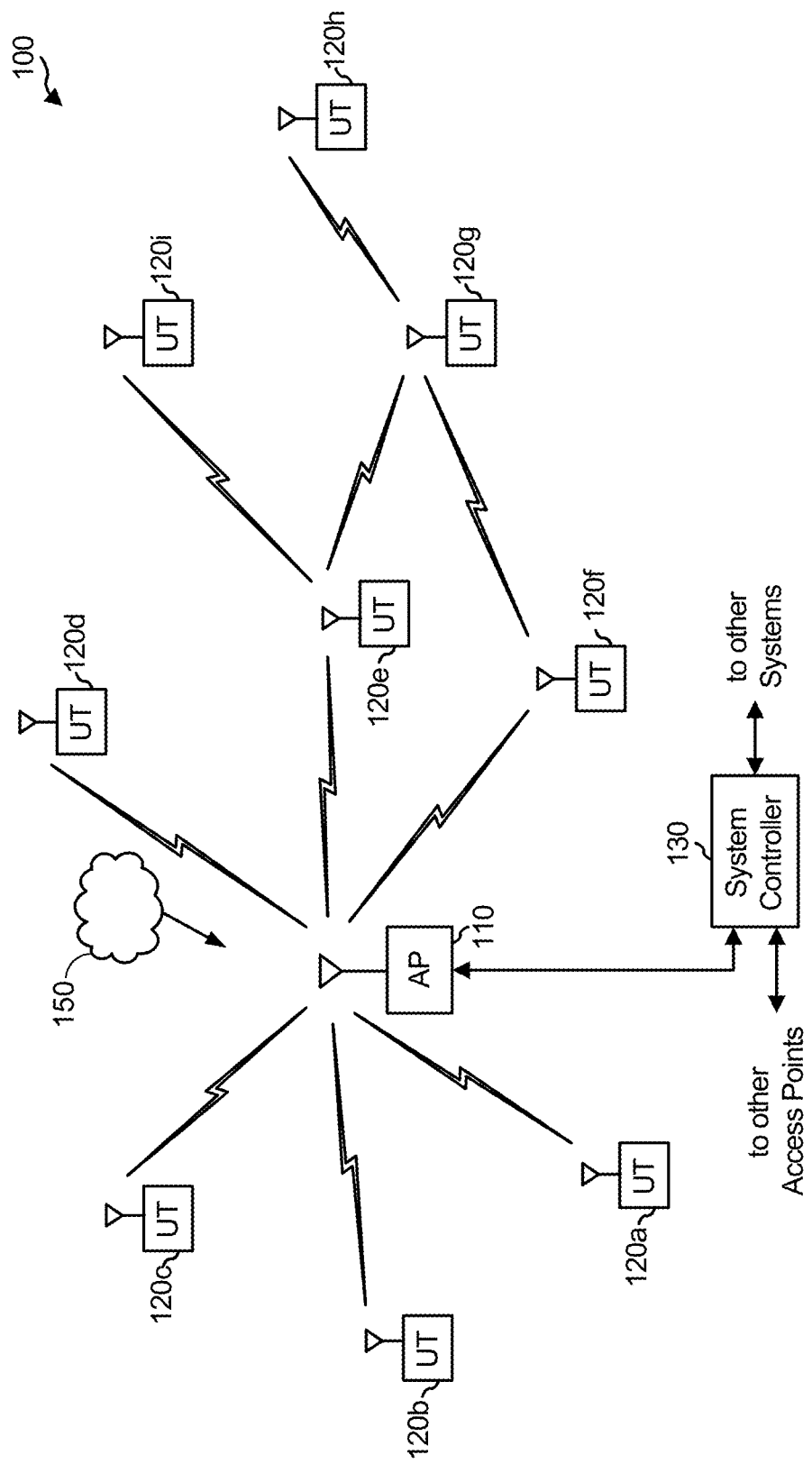
FIG. 1 illustrates a block diagram of an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an example of a wireless communication system 100 with a plurality of wireless nodes, such as access points and access terminals. For simplicity, only one access point 110 is shown. An access point is generally a fixed station that communicates with access terminals and may also be referred to as a base station or some other terminology. An access terminal may be fixed or mobile, and may be referred to as a mobile station, a wireless device or some other terminology. Access point 110 may communicate with one or more access terminals 120a to 120i at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. A system controller 130 couples to and provides coordination and control for the access point 110. The access point 110 may communicate with other devices coupled to a backbone network 150.

Figure 2:
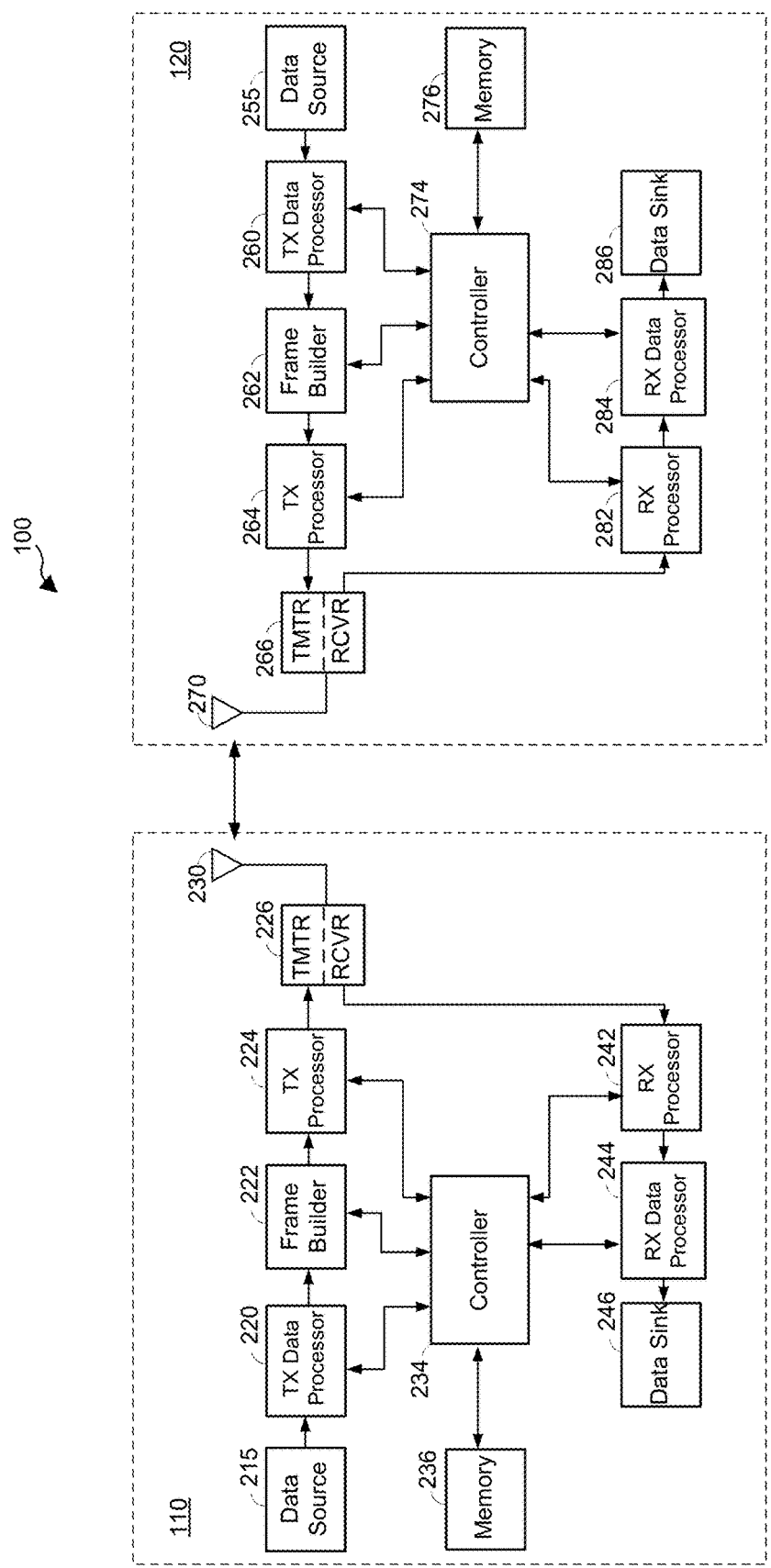
FIG. 2 illustrates a block diagram of an exemplary access point and access terminal in accordance with certain aspects of the present disclosure.

FIG. 2 illustrates a block diagram of an access point 110 (generally, a first wireless node) and an access terminal 120 (generally, a second wireless node) in the wireless communication system 100. The access point 110 is a transmitting entity for the downlink and a receiving entity for the uplink. The access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

For transmitting data, the access point 110 comprises a transmit data processor 220, a frame builder 222, a transmit processor 224, a transceiver 226, and one or more antennas 230 (for simplicity one antenna is shown). The access point 110 also comprises a controller 234 for controlling operations of the access point 110, as discussed further below.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, SQPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a data payload of the frame. The frame may include a preamble, a header, and the data payload. The preamble may include a short training field (STF) sequence and a channel estimation field (CEF) sequence to assist the access terminal 120 in receiving the frame, as discussed further below. The header may include information related to the data in the payload such as the length of the data and the MCS used to encode and modulate the data. This information allows the access terminal 120 to demodulate and decode the data. The data in the payload may be divided among a plurality of blocks, where each block may include a portion of the data and a guard interval (GI) to assist the receiver with phase tracking, as discussed further below. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

The transceiver 226 receives and processes (e.g., converts to analog, amplifies, filters, and frequency upconverts) the output of the transmit processor 224 for transmission via the one or more antennas 230. For example, the transceiver 226 may upconvert the output of the transmit processor 224 to a transmit signal having a frequency in the 60 GHz range.

In certain aspects, the transmit processor 224 may support multiple-output-multiple-input (MIMO) transmission. In these aspects, the access point 110 may include multiple antennas and multiple transceivers (e.g., one for each antenna). The transmit processor 224 may perform spatial processing on the incoming data symbols and provide a plurality of transmit symbol streams for the plurality of antennas. The transceivers receive and processes (e.g., converts to analog, amplifies, filters, and frequency upconverts) the respective transmit symbol streams to generate transmit signals for transmission via the antennas.

For transmitting data, the access terminal 120 comprises a transmit data processor 260, a frame builder 262, a transmit processor 264, a transceiver 266, and one or more antennas 270 (for simplicity one antenna is shown). The access terminal 120 may transmit data to the access point 110 on the uplink, and/or transmit data to another access terminal (e.g., for peer-to-peer communication). The access terminal 120 also comprises a controller 274 for controlling operations of the access terminal 120, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, SQPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame may include a preamble, a header, and the data payload. The preamble may include an STF sequence and a CEF sequence to assist the access point 110 and/or other access terminal in receiving the frame, as discussed further below. The header may include information related to the data in the payload such as the length of the data and the MCS used to encode and modulate the data. The data in the payload may be divided among a plurality of blocks where each block may include a portion of the data and a guard interval (GI) assisting the access point and/or other access terminal with phase tracking, as discussed further below. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceiver 266 receives and processes (e.g., converts to analog, amplifies, filters, and frequency upconverts) the output of the transmit processor 264 for transmission via the one or more antennas 270. For example, the transceiver 266 may upconvert the output of the transmit processor 264 to a transmit signal having a frequency in the 60 GHz range.

In certain aspects, the transmit processor 264 may support multiple-output-multiple-input (MIMO) transmission. In these aspects, the access terminal 120 may include multiple antennas and multiple transceivers (e.g., one for each antenna). The transmit processor 264 may perform spatial processing on the incoming data symbols and provide a plurality of transmit symbol streams for the plurality of antennas. The transceivers receive and processes (e.g., converts to analog, amplifies, filters, and frequency upconverts) the respective transmit symbol streams to generate transmit signals for transmission via the antennas.

For receiving data, the access point 110 comprises a receive processor 242, and a receive data processor 244. In operation, the transceiver 226 receives a signal (e.g., from the access terminal 120), and processes (e.g., frequency downconverts, amplifies, filters and converts to digital) the received signal.

The receive processor 242 receives the output of the transceiver 226, and processes the output to recover data symbols. For example, the access point 110 may receive data (e.g., from the access terminal 120) in a frame, as discussed above. In this example, the receive processor 242 may detect the start of the frame using the STF sequence in the preamble of the frame. The receiver processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

Further, the receiver processor 242 may estimate phase noise using the guard intervals (GIs) in the payload, and reduce the phase noise in the received signal based on the estimated phase noise, as discussed further below. The phase noise may be due to noise from a local oscillator in the access terminal 120 and/or noise from a local oscillator in the access point 110 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing, as discussed further below.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 120 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 110 may include multiple antennas and multiple transceivers (e.g., one for each antenna). Each transceiver receives and processes (e.g., frequency downconverts, amplifies, filters, converts to digital) the signal from the respective antenna. The receive processor 242 may perform spatial processing on the outputs of the transceivers to recover the data symbols.

For receiving data, the access terminal 120 comprises a receive processor 282, and a receive data processor 284. In operation, the transceiver 266 receives a signal (e.g., from the access point 110 or another access terminal), and processes (e.g., frequency downconverts, amplifies, filters and converts to digital) the received signal.

The receive processor 282 receives the output of the transceiver 266, and processes the output to recover data symbols. For example, the access terminal 120 may receive data (e.g., from the access point 110 or another access terminal) in a frame, as discussed above. In this example, the receive processor 282 may detect the start of the frame using the STF sequence in the preamble of the frame. The receive processor 282 may also perform channel estimation (e.g., using the CEF sequence in the preamble of the frame) and perform channel equalization on the received signal based on the channel estimation.

Further, the receiver processor 282 may estimate phase noise using the guard intervals (GIs) in the payload, and reduce the phase noise in the received signal based on the estimated phase noise, as discussed further below. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing, as discussed further below.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 110 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 120 may include multiple antennas and multiple transceivers (e.g., one for each antenna). Each transceiver receives and processes (e.g., frequency downconverts, amplifies, filters, converts to digital) the signal from the respective antenna. The receive processor 282 may perform spatial processing on the outputs of the transceivers to recover the data symbols.

As shown in FIG. 2, the access point 110 also comprises a memory 236 coupled to the controller 234. The memory 236 may store instructions that, when executed by the controller 234, cause the controller 234 to perform one or more of the operations described herein. Similarly, the access terminal 120 also comprises a memory 276 coupled to the controller 274. The memory 276 may store instructions that, when executed by the controller 274, cause the controller 274 to perform the one or more of the operations described herein.

FIGS. 3A-3D illustrate exemplary frames 300, 310, 320, and 330 for transmission of data via a single-channel and wideband single carrier (WB-SC) transmission modes in accordance with certain aspects of the present disclosure. These frames 300, 310, 320, and 330 have been described in detail in Provisional Application, Ser. No. 62/147,479, filed on Apr. 14, 2015, and entitled Frame Format for OFDM, SC WB, Aggregated SC, and Corresponding MIMO signals (hereinafter, "'479 Provisional Application"), which is incorporated herein by reference.

Each of the frames 300, 310, 320, and 330 comprises a legacy short training field (L-STF) sequence, a legacy channel estimation field (CEF) sequence, and a legacy header (L-HEADER). For backward compatibility purposes, the L-STF sequence, L-CEF sequence, and L-HEADER can be decoded by a receiving device operating under a legacy protocol, such as IEEE 802.11ad. With regard to the new frame 300 under a proposed new 802.11ay protocol, a legacy device may decode the 802.11ad preamble (L-STF and L-CEF) and header portion (L-HEADER) of the new frame 300 in order to calculate a network allocation vector (NAV) to determine the length of the new frame for transmission collision avoidance purposes.

As discussed in the '479 Provisional Application, the L-HEADER may be slightly modified to provide additional information related to the frame in accordance with the proposed new protocol, such as IEEE 802.11ay. In summary, such modifications may include some bits (e.g., reserved bits 44 to 46) to indicate the modulation and coding scheme (MCS) for transmission of data payload in accordance with the proposed new protocol IEEE 802.11ay, also known as Next Generation 60 (NG60 payload). Other modifications of the L-HEADER may include setting other bits (e.g., the least significant bits (LSBs) of the data payload length) to indicate a transmission power difference between the L-STF, L-CEF, L-HEADER, and Enhanced Directional Multi-Gigabit (EDMG) header (EDMG HEADER) portions, and the remaining portion (1 lay portion) of frames 300, 310, 320, and 330, as discussed in more detail below. Additional modifications of the L-HEADER may include setting some bits to indicate the number of bonded channels and the order or identity of the bonded channels (e.g., channels 1-2, 1-2-3, 1-2-3-4, 2-3, 2-3-4, and 3-4).

Each of the new frames 300, 310, 320, and 330 further comprises an EDMG HEADER with an attached data. The EDMG HEADER and attached data were described in detail in the '479 Provisional Application. The EDMG HEADER provides information concerning the new frames 300, 310, 320, and 330. Additionally, some or the entire data payload may be attached to the EDMG HEADER.

In summary, the EDMG HEADER includes: (1) a data payload length of the frame; (2) number of LDPC data blocks attached to the EDMG HEADER of the frame; (3) number spatial streams transmitted in the frame; (4) the number of bonded channels in the frame; (5) the channel offset indicating the first (lowest frequency) channel of the bonded channels; (6) the MCS used for the data in the 11ay (NG60) data payload; (7) the length (short, normal, or long) of the guard interval (GI) in each data (FFT) block in the flay (NG60) data payload; (8) the length (short or long) of the data (FFT) block in the 11ay (NG60) data payload; (9) the length (short or long) of the encoded (LDPC) block(s) in the data (FFT) block in the 11ay (NG60) data payload; (10) a long CEF field to signal a long 802.11ay CEF sequence for MIMO; (11) a power difference field to indicate a power difference between the L-STF, L-CEF, L-HEADER, and EDMG HEADER with attached data, and the 802.11ay portion (STF: AGC+initial timing, CEF, DATA PAYLOAD) for a WB-SC transmission mode frame transmitted via a plurality of bonded channels; (12) reserved bits; (13) proprietary bits; and (14) a CRC field.

As discussed in detail in the '479 Provisional Application, each of the new frames 300, 310, 320, and 330 includes an 11ay portion that may have three (3) sections: an 802.11ay STF, an 802.11ay CEF, an 802.11ay (NG60) DATA PAYLOAD, and an optional beam training sequence (TRN). The 802.11ay STF may be built on Golay codes (as in the legacy STF). During this period, a receiver is expected to complete: AGC, timing and frequency acquisition. The 802.11ay STF may use Ga and Gb in the same order as the 802.11ad. Optionally, the Golay codes can be 128 (as in 802.11ad) or 256 or 512. The 802.11ay CEF sequence may also be done using the same Golay construction of the L-CEF sequence of 802.11ad, only replacing the 128 sequences to 256 sequences for double channel, to 512 sequences for triple and quad channels, and to 1024 for 5-8 channels.

As discussed in more detail below, the 802.11ay (NG60) DATA PAYLOAD may be modulated and encoded using MSC similar to the 802.11ad with the following changes: (1) In addition to BPSK, QPSK and 16QAM, higher modulations are defined (and can be used): 64QAM, 64APSK, 128APSK, 256QAM, and 256APSK; (2) data symbol (FFT) block can be 512 (as in 802.11ad) or 1024, 1536 or 2048; and (3) GI may also be Golay code as in 802.11ad, with more length options supported: 64 (as in 802.11ad), 32, 96, 128, 192, 256, 384, or 512.

The beam training sequence (TRN) is optional in all cases. Note that if the 802.11ay section is not used, then the TRN is the same as in 802.11ad. When 802.11ay section is used, then it uses the 802.11ay TRN options. 802.11ay TRN field is built in the same way as the 802.11ad, with options to increase the Golay codes by factor of 2 or 4 (e.g., use Golay of 256 or 512, instead of 128).

As discussed in detail in the '479 Provisional Application, the exemplary frame 300 (FIG. 3A) is the extension of 802.11ay for a single channel case. The frame 300 comprises the legacy preamble (L-STF and L-CEF), legacy Header (L-HEADER), and new 802.11ay header (EDMG HEADER). The frame 300 facilitates the new MCSs of 802.11ay protocol with the transmission of the 802.11ay (EDMG STF) and DATA PAYLOAD. Note that the 802.11ay CEF (EDMG CEF) is not present since for a single channel, there is no need for re-estimating the channel (i.e., the legacy L-CEF is used). The EDMG STF is present since a receiver may improve the receiver chain setup for higher constellations of the 802.11ay modulation.

As discussed in detail in the '479 Provisional Application, the exemplary frame 310 (FIG. 3B) is the extension of 802.11ay for a two channel bonding case. The frame 310 comprises a first (legacy) channel (e.g., CH1) for transmitting the legacy preamble (L-STF and L-CEF), L-HEADER, and EDMG HEADER. The frame 310 further comprises a second (legacy) channel (e.g., CH2) for transmitting the legacy preamble (L-STF and L-CEF), L-HEADER, and EDMG HEADER. Note, that the attached data following the EDMG HEADER of the first channel (CH1) may be different than the attached data following the EDMG HEADER of the second channel (CH2). The information fields of the EDMG HEADER may be configured as per EDMG HEADER format previously discussed. The 802.11ay section of the frame 310, namely the EDMG STF, EDMG CEF, DATA PAYLOAD, and optional TRN, are transmitted via a bonded channel comprising at least a portion of each of the first and second channels (e.g., CH1+CH2). As previously discussed, the transmission of the L-STF AND L-CEF, L-HEADER, and EDMG HEADER uses an MCS specified in legacy 802.11ad, and the transmission of the 802.11ay portion (EMDG STF, EDMG CEF, DATA PAYLOAD) uses an MCS specified in 802.11ay, both of which may be different.

As discussed in detail in the '479 Provisional Application, the exemplary frame 320 (FIG. 3C) is the extension of 802.11ay frame for a three (3) channel bonding case (e.g., CH1+CH2+CH3). The exemplary frame 330 (FIG. 3D) is the extension of 802.11ay frame for the four (4) channel bonding case (e.g., CH1+CH2+CH3+CH4). From the above FIGS. 3A-3D, it is clear that the method is extendable to any number of contiguous channels.

Figure 3A:
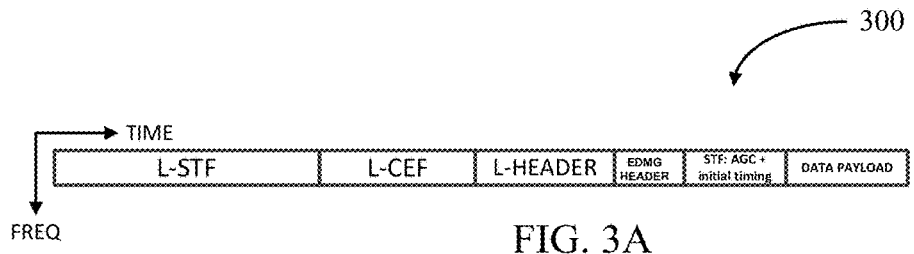
FIGS. 3A-3D illustrate exemplary frames for transmission of data via single channel and wideband single carrier (WB-SC) transmission modes in accordance with certain aspects of the present disclosure.
Figure 3B:
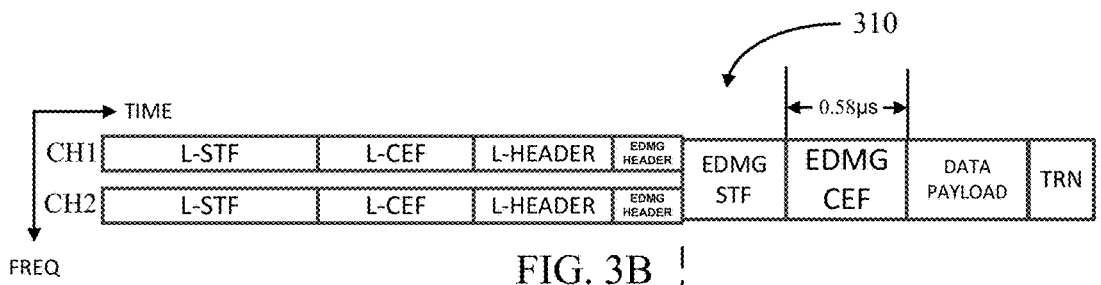
Figure 3C:
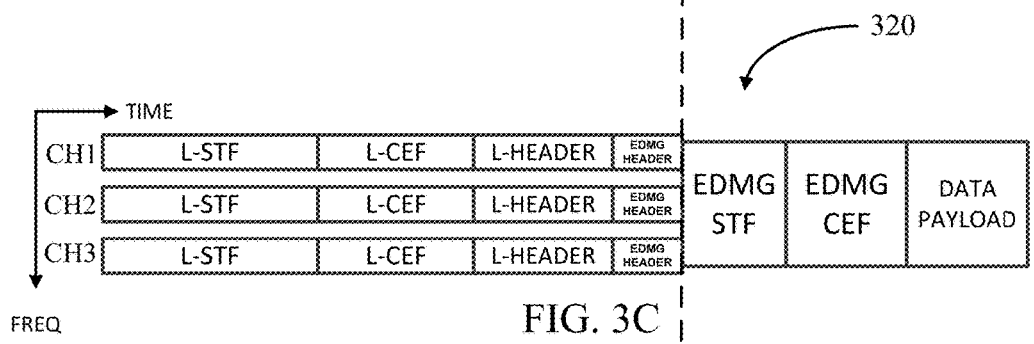
Figure 3D:
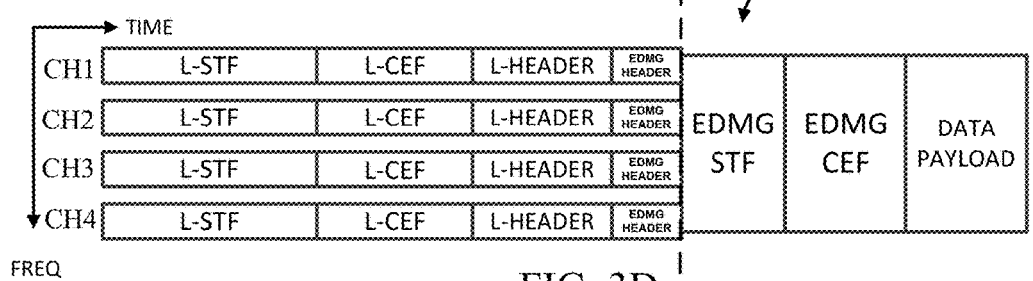
Figure 3E:
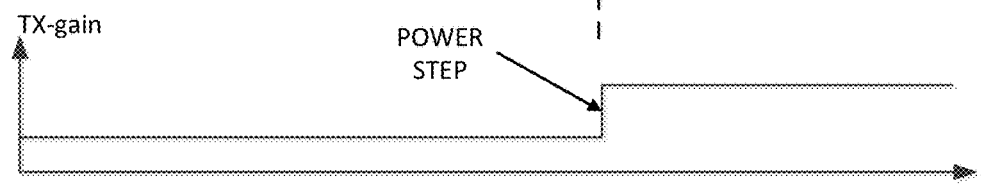
FIG. 3E illustrates an exemplary transmit power profile for an exemplary frame for transmission of data via a wideband single carrier (WB-SC) transmission mode in accordance with certain aspects of the present disclosure.

FIG. 3E illustrate an exemplary transmission power profile for any of the exemplary frames 310, 320, and 330 in accordance with another aspect of the disclosure. As discussed in detail in the '479 Provisional Application, the transmit power for the L-STF, L-CEF, L-HEADER, and EDMG HEADER (with attached data) of the aggregate channels is backed off to reduce peak to average power ratio (PAPR), and the transmit power for the 11ay section (EDMG STF, EDMG CEF, and DATA PAYLOAD) is increased for better detection at a receiver. As discussed above, the power difference is indicated in the EDMG HEADER as well as the modified L-HEADER section.

Figures 4A, 4B, 4C:
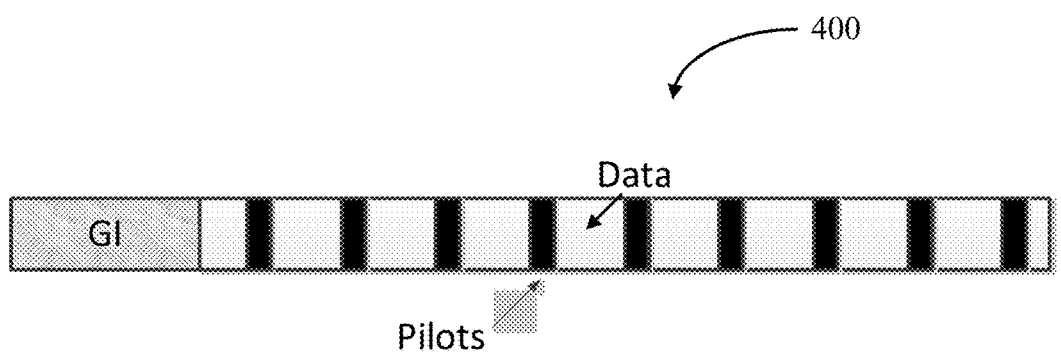
FIGS. 4A-4B illustrate tables depicting parameters associated with an exemplary data block in accordance with certain aspects of the present disclosure.
FIG. 4C illustrates a diagram of an exemplary data block in accordance with another aspect of the disclosure.

FIGS. 4A-4B illustrate tables depicting parameters of an exemplary data symbol block (also referred to as an Fast Fourier Transform (FFT) block) transmitted in the DATA PAYLOAD of the new frames 300, 310, 320, and 330 in accordance with certain aspects of the present disclosure. The columns of the tables from left to right are identified as the number of channels bonded, the symbol rate, the size of the data (FFT) block, the length of the long guard interval (GI) (and corresponding maximum delay spread in Table 4B), the length of the normal guard interval (GI) (and corresponding maximum delay spread in Table 4B), and the length of the short guard interval (GI) (and corresponding maximum delay spread in Table 4B).

The first row of the tables provide details for the symbol rate, data (FFT) block size, long GI, normal GI, and short GI associated with the DATA PAYLOAD for a single channel frame, such as frame 300 previously discussed. That is, for the single channel WB-SC frame 300, the symbol rate is 1.76 Giga symbols per second (Gsps), the data (FFT) block size is 512 symbols, the long GI length is 128 symbols (delay spread of 72 nanoseconds (ns)), the normal GI length is 64 symbols (delay spread of 36 ns), and the short GI length is 32 symbols (delay spread of 18 ns). Accordingly, the number of data symbols in each data (FFT) block is 384 for the case where the GI length is 128, the number of data symbols in each data (FFT) block is 448 for the case where the GI length is 64, and the number of data symbols in each data (FFT) block is 480 for the case where the GI length is 32. As previously discussed, the GI may be based on Golay codes or other codes known to both the transmitting and receiving devices. The symbol rate, data (FFT) block size, and normal GI length for a single channel are used for channels in 802.11ad. The long and short GI lengths for a single channel are used for in the proposed protocol 802.11ay data frame, such as frame 300 (and not available in 802.11ad).

The second row of the tables provide details for the symbol rate, data (FFT) block size, long GI, normal GI, and short GI associated with the DATA PAYLOAD for a two-bonded channel, such as frame 310 previously discussed. That is, for the two-bonded channel WB-SC frame 310, the symbol rate is 2*1.76 Gsps, the data (FFT) block size is 1024 symbols, the long GI length is 256 symbols (delay spread of 72 ns), the normal GI length is 128 symbols (delay spread of 36 ns), and the short GI length is 64 symbols (delay spread of 18 ns). Accordingly, the number of data symbols in each data (FFT) block is 768 for the case where the GI length is 256, 896 for the case where the GI length is 128, and 960 for the case where the GI length is 64. Note that the symbol rate, the data (FFT) size, and long, normal, and short GI lengths are a function of (e.g., increases with) the number of bonded channels.

The third row of the tables provide details for the symbol rate, data (FFT) block size, long GI, normal GI, and short GI associated with the DATA PAYLOAD for a three-bonded channel, such as frame 320 previously discussed. That is, for the three-bonded channel WB-SC frame 320, the symbol rate is 3*1.76 Gsps, the data (FFT) block size is 1536 symbols, the long GI length is 384 (delay spread 72 ns), the normal GI length is 192 symbols (delay spread 36 ns), and the short GI length is 96 symbols (delay spread 18 ns). Accordingly, the number of data symbols in each data (FFT) block is 1152 for the case where the GI length is 384, 1344 for the case where the GI length is 192, and 1440 for the case where the GI length is 96. Again, as indicated by the tables, the symbol rate, the data (FFT) size, and long, normal, and short GI lengths are a function of (e.g., increases with) the number of bonded channels.

The fourth row of the tables provide details for the symbol rate, data (FFT) block size, long GI, normal GI, and short GI associated with the 11ay (NG60) data payload for a four-bonded channel, such as frame 330 previously discussed. That is, for the four-bonded channel WB-SC frame 3230, the symbol rate is 4*1.76 Gsps, the data (FFT) block size is 2048 symbols, the long GI length is 512 symbols (delay spread of 72 ns), the normal GI length is 256 symbols (delay spread of 36 ns), and the short GI length is 128 symbols (delay spread of 18 ns). Accordingly, the number of data symbols in each data (FFT) block is 1536 for the case where the GI length is 512, 1792 for the case where the GI length is 256, and 1920 for the case where the GI length is 128. Again, as indicated by the tables, the symbol rate, the data (FFT) size, and long, normal, and short GI lengths are a function (e.g., proportional) to the number of bonded channels.

FIG. 4C illustrates a diagram of an exemplary data (FFT) block 400 in accordance with another aspect of the disclosure. In this example, the GI (area with hatched lines) is placed at the beginning of the data (FFT) block 400. Optionally, one or more pilot signals, as indicated by the darkened area, may be interspersed between portions of the data symbols (lightened area) within the data (FFT) block 400. Each pilot signal may include one or more symbols known to both the transmitting and receiving devices. As another option, the GI symbols may be split with a first portion of the symbols being continuously located at the beginning of the data (FFT) block, and a second portion of the symbols being distributed as the pilot signals interspersed between portions of the data symbols.

FIGS. 5A-5B illustrate tables depicting parameters of exemplary modulation coding schemes (MCS) for transmitting the DATA PAYLOAD via a wideband single carrier (WB-SC) transmission mode (as well as an aggregate SC transmission mode as discussed further herein) in accordance with certain aspects of the present disclosure. The major columns of the table in FIG. 5A include the MCS index, modulation, number of coded bits per symbol ($N_{CBPS}$), repetition of the data (FFT) blocks, code rate associated with the encoding of the data (e.g., using low density parity check (LDPC)), and data rates associated with the transmission of the DATA PAYLOAD for the cases of a long, normal, and short GI.

Under the data rate column, there are primary sub-columns pertaining to the single-channel frame 300 (1Ch), the two-bonded channel frame 310 (2Ch), the three-bonded channel frame 320 (3Ch), and the four-bonded channel frame 330 (3Ch). Under each of the primary sub-columns, there are three secondary sub-columns: a left one pertaining to the long GI, a middle one pertaining to the normal GI, and a right one pertaining to the short GI, as discussed in detail with respect to the tables of FIGS. 4A-4B.

As indicated in the table in FIG. 5A, there are 32 MCS for the DATA PAYLOAD. MCS 1-9 AND MCS 11-13 are the same MCS 1-12 as used in 802.11ad, respectively. That is, MCS 1-9 and 11-13 respectively include: (1) π/2-BPSK with ½ code rate (data (FFT) blocks repeated), (2) π/2-BPSK with ½ code rate (data (FFT) blocks not repeated), (3) π/2-BPSK with ⅝ code rate, (4) π/2-BPSK with ¾ code rate, (5) π/2-BPSK with ¹³/₁₆ code rate, (6) π/2-QPSK with ½ code rate, (7) π/2-QPSK with ⅝ code rate, (8) π/2-QPSK with ¾ code rate, (9) π/2-QPSK with ¹³/₁₆ code rate, (11) π/2-16QAM with a ½ code rate, (12) π/2-16QAM with a ⅝ code rate, and (13) π/2-16QAM with a ¾ code rate.

The new proposed protocol (802.11ay (NG60)) DATA PAYLOAD includes additional MCS beyond those available for 802.11ad that are capable of providing increased data throughput. The additional ones are MCS 10 and 14-32 as follows: (10) π/2-QPSK with ⅞ code rate; (14) π/2-16QAM with a ¹³/₁₆ code rate; (15) π/2-16QAM with a ⅞ code rate; (16) π/2-64QAM with a ⅝ code rate; (17) π/2-64QAM with a ¾ code rate; (18) π/2-64QAM with a ¹³/₁₆ code rate; (19) π/2-64QAM with a ⅞ code rate; (20) π/2-64APSK with a ⅝ code rate; (21) π/2-64APSK with a ¾ code rate; (22) π/2-64APSK with a ¹³/₁₆ code rate; (23) π/2-64APSK with a ⅞ code rate; (24) π/2-128APSK with a ¾ code rate; (25) π/2-128APSK with a ¹³/₁₆ code rate; (26) π/2-128APSK with a ⅞ code rate; (27) π/2-256QAM with a ¾ code rate; (28) π/2-256QAM with a ¹³/₁₆ code rate; (29) π/2-256QAM with a ⅞ code rate; (30) π/2-256APSK with a ¾ code rate; (31) π/2-256APSK with a ¹³/₁₆ code rate; and (32) π/2-256APSK with a ⅞ code rate.

The remaining portions of the table depicted in FIG. 5A provide information about the corresponding MCS. For example, the $N_{CBPS}$ for modulations BPSK, QPSK, 16QAM, 64QAM, 64APSK, 128APSK, 256QAM, and 256APSK are 1, 2, 4, 6, 6, 7, 8, and 8, respectively. The data (FFT) blocks are repeated twice for MCS-1, but are not repeated for the rest MCS-2 to MCS-32. As can be seen by the rest of the table, the data rates increase with increasing MCS index, with the number of bonded channels, and from the long GI to the short GI.

Figure 6:
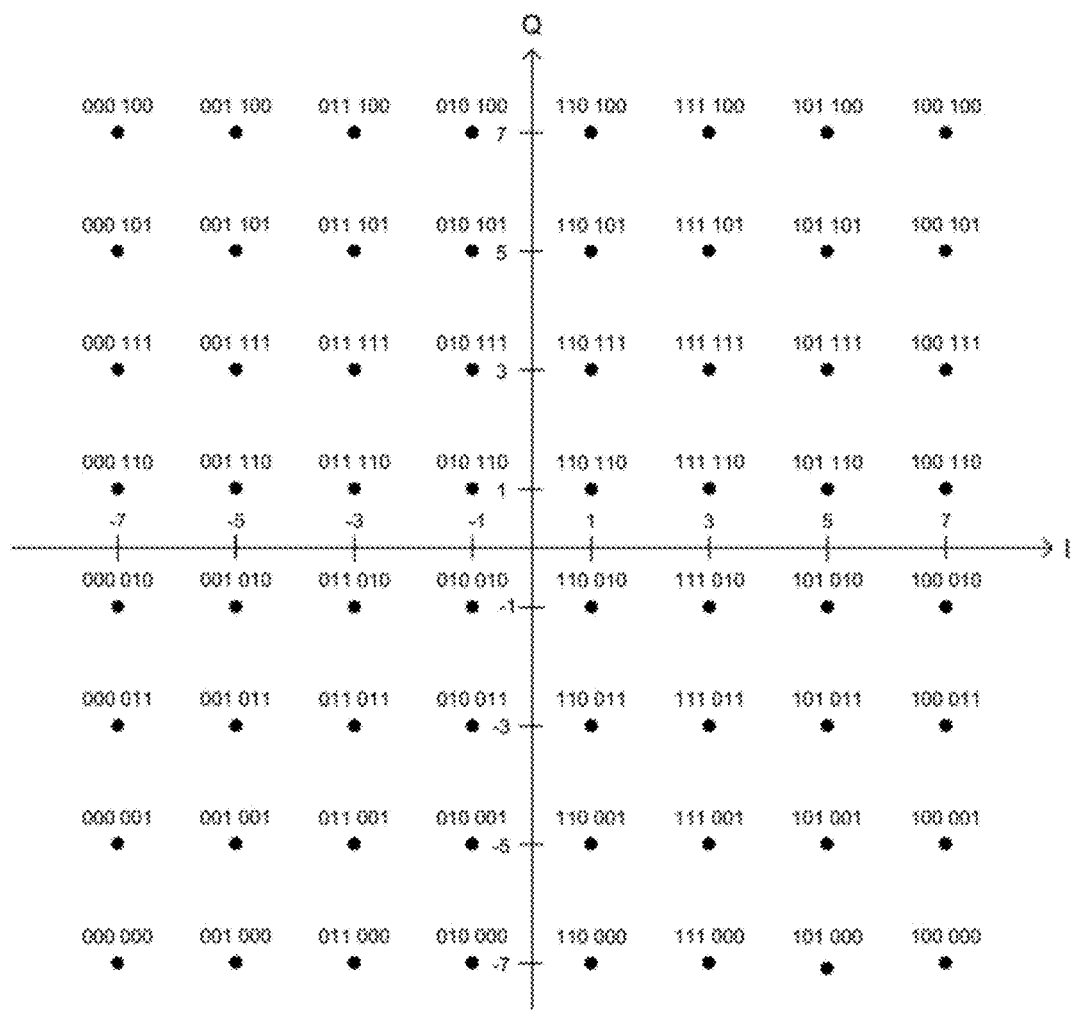
FIG. 6 illustrates an exemplary constellation diagram for converting data bits into data symbols (or vice-versa) pursuant to a 64 quadrature amplitude modulation (64QAM) in accordance with another aspect of the present disclosure.

FIG. 6 illustrates an exemplary constellation diagram for converting encoded bits into data symbols (or vice-versa) pursuant to a 64 quadrature amplitude modulation (64QAM) in accordance with another aspect of the present disclosure. As can be seen in the diagram, six (6) encoded bits may be mapped to a single symbol (constellation) per 64QAM modulation. The particular mapping of the encoded bits to the symbol (constellation) is but one example (e.g., 011 101 maps to constellation (−3I, 5Q)). It shall be understood that the six (6) encoded bits may be mapped to the 64 constellations in other manners. Also noted is that the QAM modulation maps encoded bits into two-dimensional (I, Q) Cartesian-coordinate constellations. The $\pi/2$-64QAM, as indicated in the table of FIG. 5, indicates that the constellations are rotated by a phase of $\pi/2$.

Figures 7A, 7B:
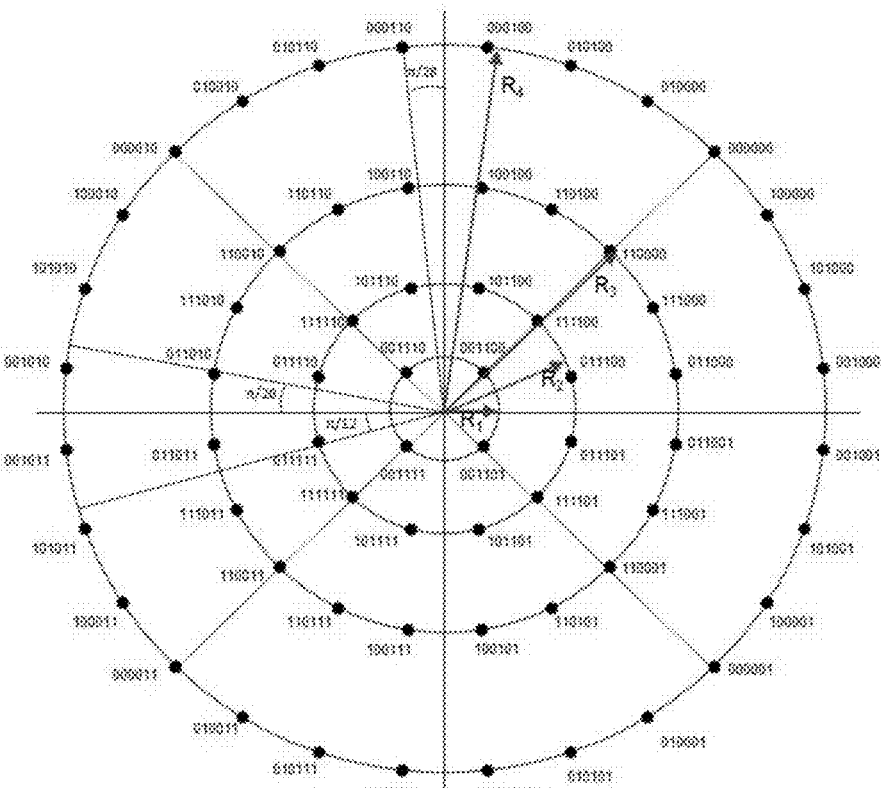
FIGS. 7A-7B illustrate a constellation diagram and phase definition table for converting data bits into data symbols (or vice-versa) pursuant to a first version of a 64 amplitude phase-shift keying (64APSK) modulation in accordance with another aspect of the present disclosure.

FIGS. 7A-7B illustrate a constellation diagram and phase definition table for converting data bits into data symbols (or vice-versa) pursuant to a first version of a 64 amplitude phase-shift keying (APSK1) modulation in accordance with another aspect of the present disclosure. The constellation diagram for 64 APSK1 uses polar coordinates to map six (6) encoded bits to a particular symbol (constellation). The particular mapping of the encoded bits to the symbol (constellation) is but one example (e.g., 011 101 maps to constellation (R2, $23\pi/12$)). It shall be understood that the six (6) encoded bits may be mapped to the 64 constellations in other manners. The $\pi/2$-64APSK, as indicated in the table of FIG. 5, indicates that the constellations are rotated by a phase of $\pi/2$.

The phase definitions table for 64ASPSK1 as depicted in FIG. 7B provides information regarding the radius, phase, and radius ratios for mapping the six (6) encoded bits to the 64 symbols (constellations). The label column indicates the six (6) encoded bits with two LSB variables p and q. The four MSBs of the encoded bits map to a particular radius. For example, the four MSBs being 1001 map to a constellation having a radius R3, as indicated by the corresponding entry in the second column. The four right columns provide the phase for the corresponding combination of p and q. For instance, encoded word 100101 is mapped to R3 and phase $31\pi/20$ as indicated by the corresponding entries in the second and fourth columns. The radius ratios for the 64ASPSK1 are R2/R1=2.4, R3/R1=4.3, and R4/R1=7.0.

Figure 8A:
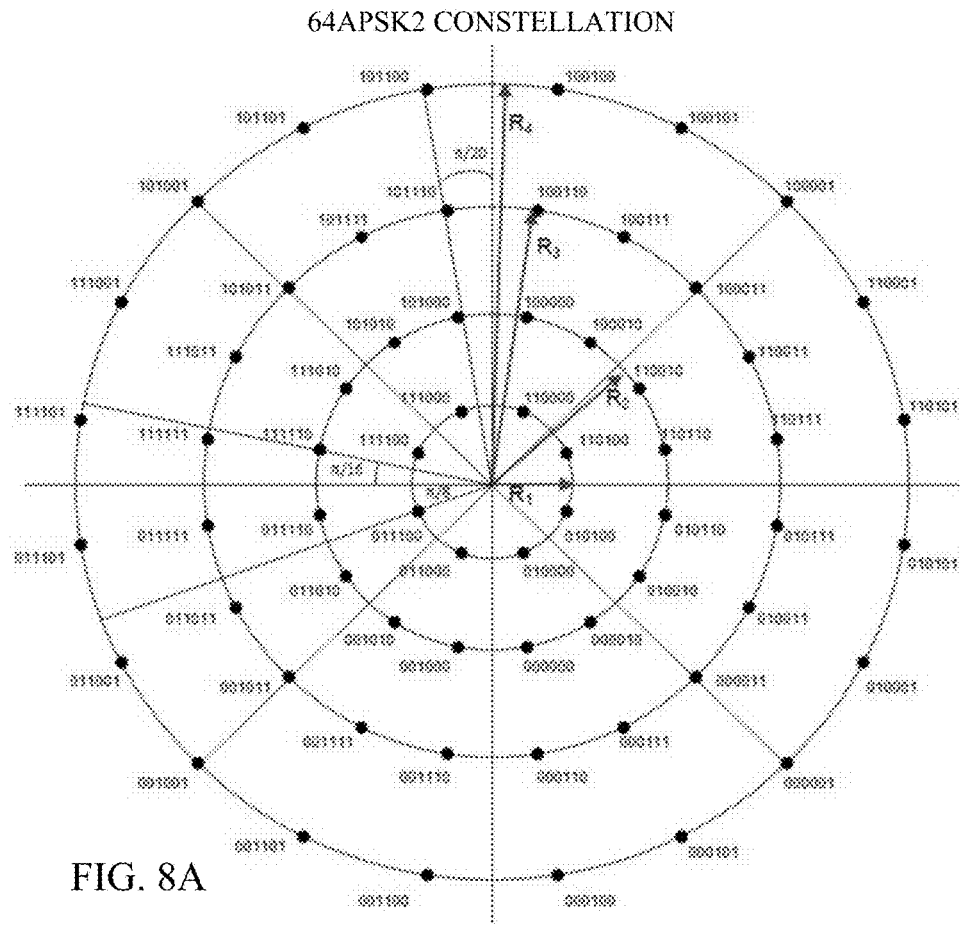

FIGS. 8A-8B illustrate a constellation diagram and phase definition table for converting data bits into data symbols (or vice-versa) pursuant to a second version of a 64 amplitude phase-shift keying (APSK2) modulation in accordance with another aspect of the present disclosure. The constellation diagram for 64APSK2 is just another manner of mapping six (6) encoded bits to a particular symbol (constellation). The constellation diagram and the phase definitions are similar to the constellation diagram and phase definitions of FIGS. 7A-7B. The radius ratios for the 64ASPSK2 are R2/R1=2.2, R3/R1=3.6, and R4/R1=5.0. Similarly, the $\pi/2$-64APSK for this version, as indicated in the table of FIG. 5, indicates that the constellations are rotated by a phase of $\pi/2$.

Figure 9A:
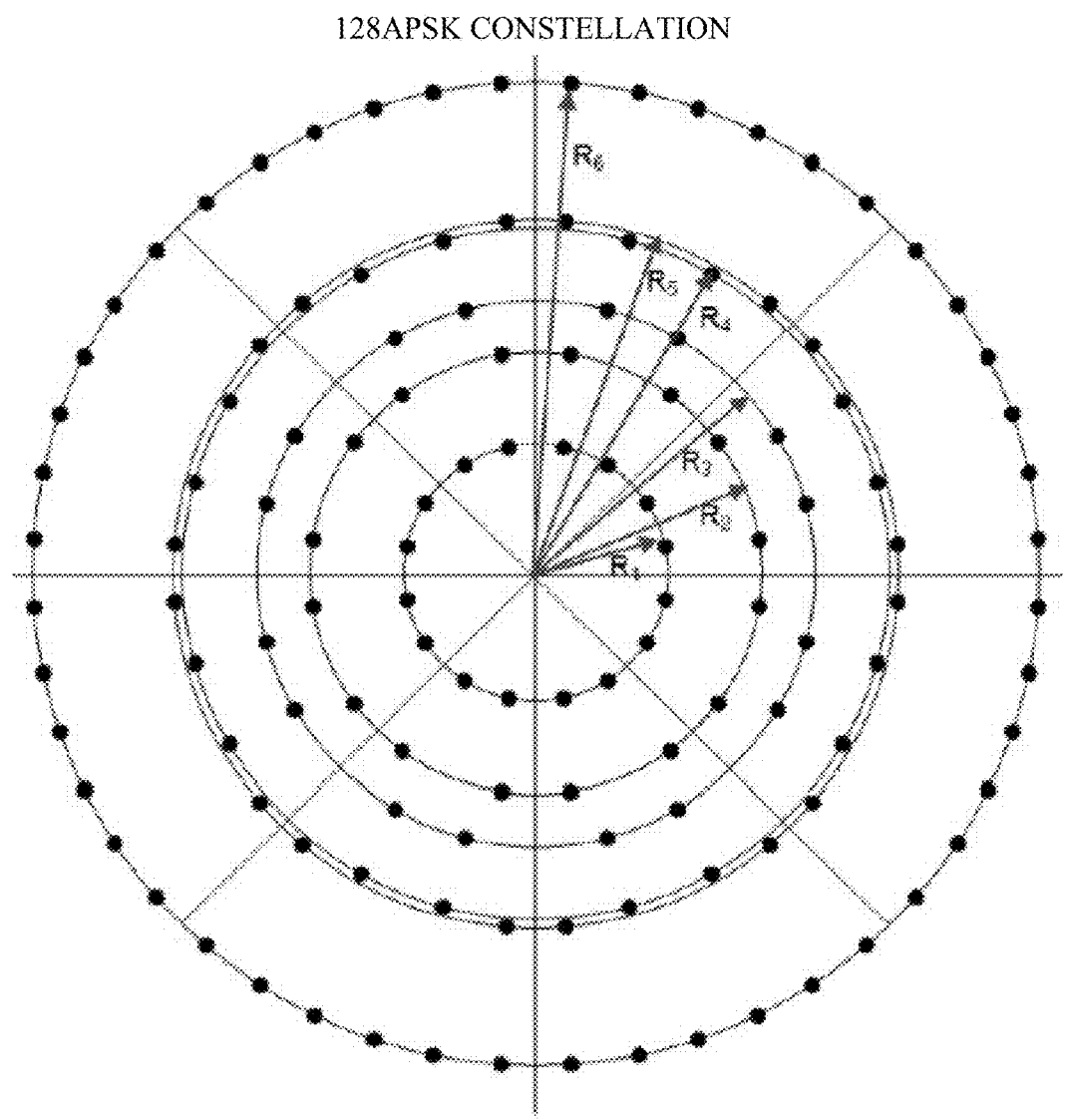

FIGS. 9A-9B illustrate a constellation diagram and phase definition table for converting data bits into data symbols (or vice-versa) pursuant to a 128 amplitude phase-shift keying (APSK) modulation in accordance with another aspect of the present disclosure. The constellation diagram for 128APSK uses polar coordinates to map seven (7) encoded bits to a particular symbol (constellation). The particular mapping of the encoded bits to the symbol (constellation) is but one example (e.g., 1011101 maps to constellation (R3, $1201\pi/720$)). It shall be understood that the six (7) encoded bits may be mapped to the 128 constellations in other manners. The $\pi/2$-128APSK, as indicated in the table of FIG. 5, indicates that the constellations are rotated by a phase of $\pi/2$.

The phase definitions table for 128APSK as depicted in FIG. 9B provides information regarding the radius, phase, and radius ratios for mapping the seven (7) encoded bits to the 128 symbols (constellations). The label column indicates the seven (7) encoded bits with two MSB variables q and p. The five LSBs of the encoded bits map to a particular radius. For example, the five LSBs being 11101 map to a constellation having a radius R3, as indicated by the corresponding entry in the second column. The four right columns provide the phase for the corresponding combination of p and q. For instance, encoded word 100101 is mapped to R3 and phase $1201\pi/720$ as indicated by the corresponding entries in the second and fourth columns. The radius ratios for the 128ASPSK are R2/R1=1.715, R3/R1=2.118, R4/R1=2.681, R5/R1=2.75, and R6/R1=3.25.

Figure 10:
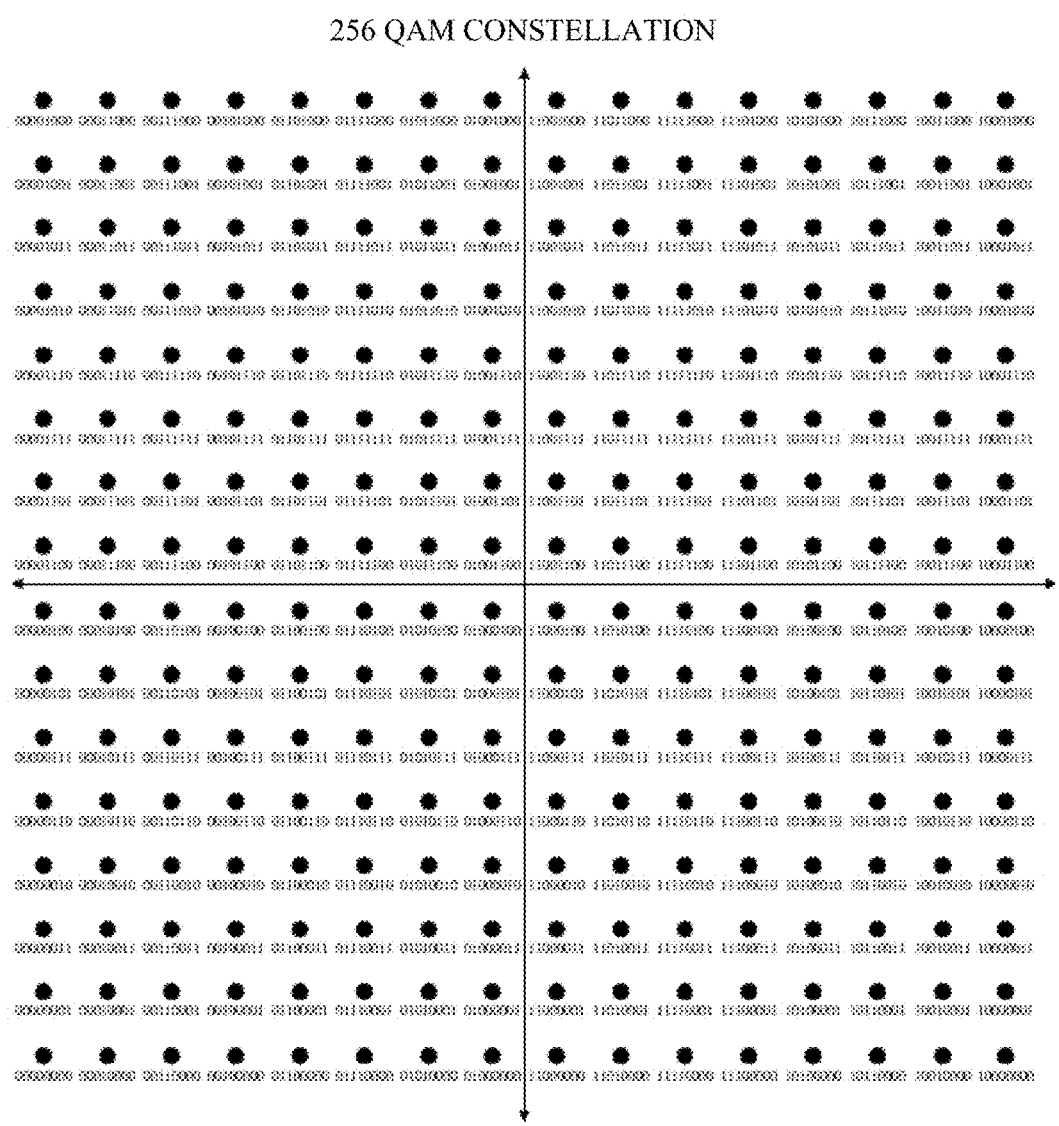
FIG. 10 illustrates a constellation diagram for converting data bits into data symbols (or vice-versa) pursuant to a 256 quadrature amplitude modulation (256QAM) in accordance with another aspect of the present disclosure.

FIG. 10 illustrates a constellation diagram for converting data bits into data symbols (or vice-versa) pursuant to a 256 quadrature amplitude modulation (256QAM) in accordance with another aspect of the present disclosure. As can be seen in the diagram, eight (8) encoded bits are mapped to a single symbol (constellation) per 256QAM modulation. The particular mapping of the encoded bits to the symbol (constellation) is but one example. It shall be understood that the eight (8) encoded bits may be mapped to the 256 constellations in other manners. Also noted is that a QAM modulation maps encoded bits into two-dimensional (I, Q) Cartesian-coordinate constellations. The $\pi/2$-256QAM, as indicated in the table of FIG. 5, indicates that the constellations are rotated by a phase of $\pi/2$.

Figures 11A, 11B:
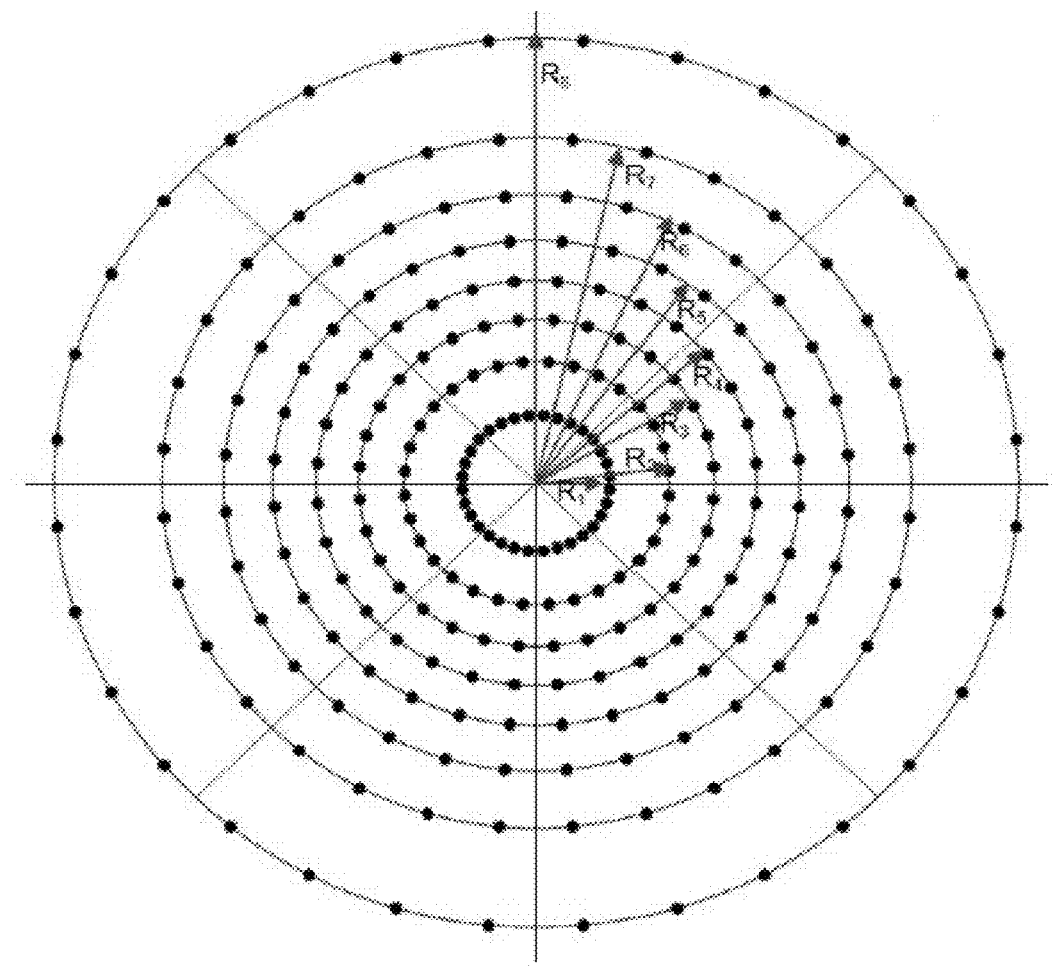

FIGS. 11A-11C illustrate a constellation diagram, labels definition table, and phase definition table for converting data bits into data symbols (or vice-versa) pursuant to a 256 amplitude phase-shift keying (256APSK) modulation in accordance with another aspect of the present disclosure. The constellation diagram for 256APSK uses polar coordinates to map eight (8) encoded bits to a particular symbol (constellation). The particular mapping of the encoded bits to the symbol (constellation) is but one example (e.g., 011 10101 maps to constellation (R3, $13\pi/32$)). It shall be understood that the eight (8) encoded bits may be mapped to the 256 constellations in other manners. The $\pi/2$-256APSK, as indicated in the table of FIG. 5, indicates that the constellations are rotated by a phase of $\pi/2$.

The labels definition table depicted in FIG. 11B provides a mapping of the three MSBs of the eight (8) encoded bits to a radius associated with the corresponding constellation of the 256APSK. For example, MSB 011 of the encoded bits is mapped to R3, as indicated by the corresponding entry in the radius column. The phase definitions table for 256APSK as depicted in FIG. 11C provides information regarding the phase and radius ratios for mapping the five (5) LSB of the encoded bits to the phase of the corresponding constellation. For example, the five LSB being 10101 map a phase $13\pi/32$ as indicated by the corresponding entry in the third column. The radius ratios for the 256ASPSK are R2/R1=1.794, R3/R1=2.409, R4/R1=2.986, R5/R1=3.579, R6/R1=4.045, R7/R1=4.6, and R8/R1=5.3.

Figures 12A, 12B:
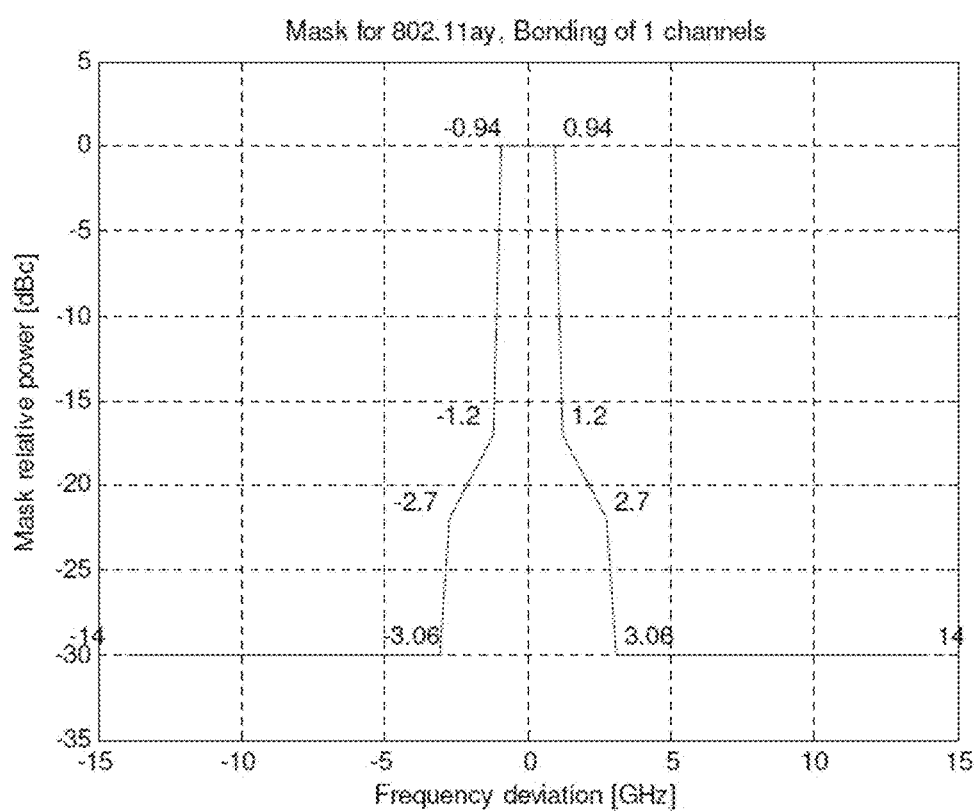
FIG. 12A illustrates a table of exemplary parameters associated with spectrum masks applied to various frames described herein in accordance with another aspect of the present disclosure.
FIG. 12B illustrates a graph of an exemplary spectrum mask applied to a single-channel frame in accordance with another aspect of the present disclosure.

FIG. 12A illustrates a table of exemplary parameters for spectrum masks applied to various frames described herein in accordance with another aspect of the present disclosure. The table specifies parameters for the spectrum mask applied to the WB-SC frames, aggregate-SC frames, and OFDM frames for a single-channel, two-bonded channels, three-bonded channels, and four-bonded channels. The columns of the table include, from left to right, the corner, the relative power in dBc, the single-channel, the two-bonded channel, the three-bonded channel, the four-bonded channel, and the transmission mode that dominates the spectrum mask.

In particular, for a single-channel frame, such as an single-channel SC or OFDM frame, the corners 1, 2, 3, and 4 of the spectrum mask are ±0.94 GHz from center frequency (fc) at substantially 0 dBc relative power, ±1.2 GHz from center frequency (fc) at substantially −17 dBc relative power, ±2.7 GHz from center frequency (fc) at substantially −22 dBc relative power, and ±3.06 GHz from center frequency (fc) at substantially −30 dBc, respectively. FIG. 12B illustrates a graph of the exemplary spectrum mask applied to a single-channel frame.

Figure 12C:
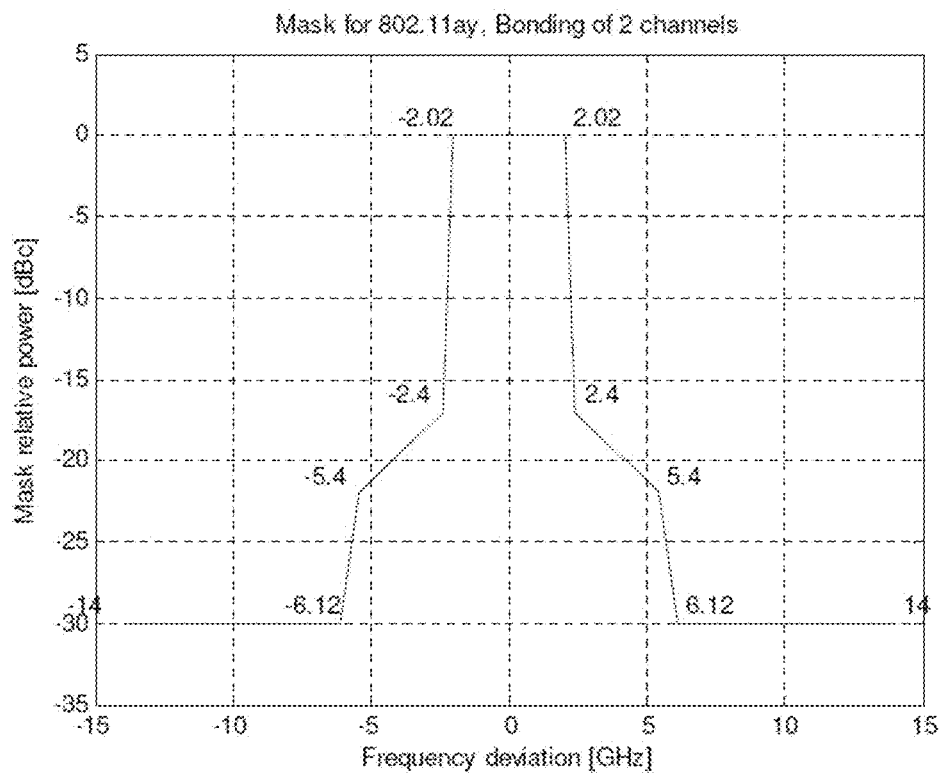
FIG. 12C illustrates a graph of an exemplary spectrum mask applied to a two-bonded channel frame in accordance with another aspect of the present disclosure.

For a two-bonded channel frame, such as the two-bonded channel WB-SC OFDM frame, the corners 1, 2, 3, and 4 of the spectrum mask are ±2.02 GHz from center frequency (fc) at substantially 0 dBc relative power, ±2.4 GHz from center frequency (fc) at substantially −17 dBc relative power, ±5.4 GHz from center frequency (fc) at substantially −22 dBc relative power, and ±6.12 GHz from center frequency (fc) at substantially −30 dBc. FIG. 12C illustrates a graph of the exemplary spectrum mask applied to a two-bonded channel frame.

Figure 12D:
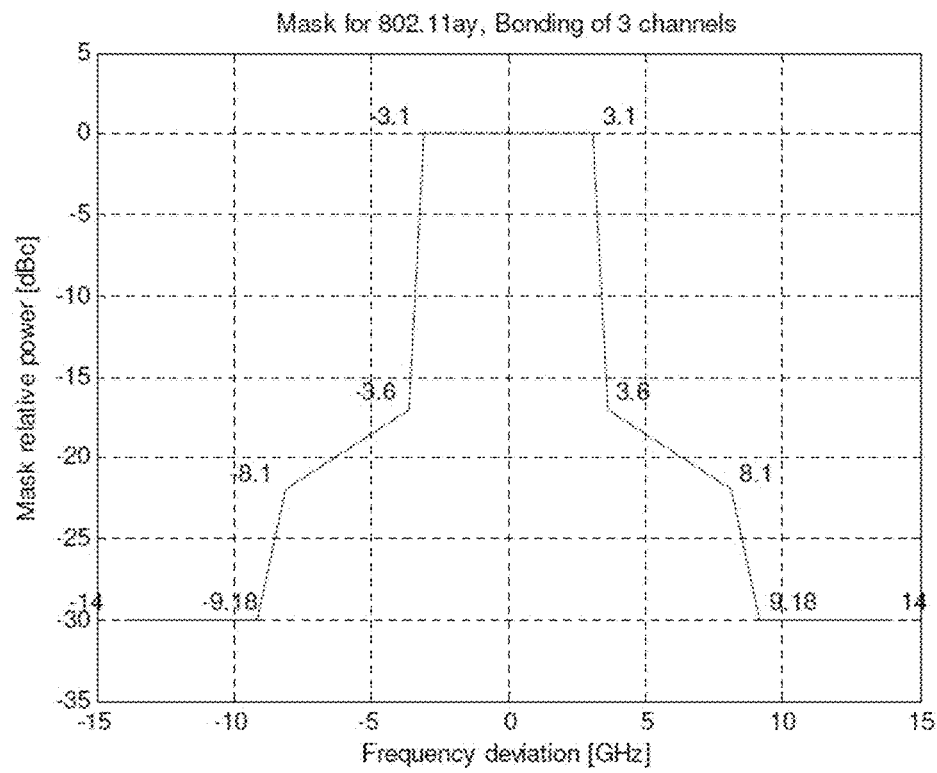
FIG. 12D illustrates a graph of an exemplary spectrum mask applied to a three-bonded channel frame in accordance with another aspect of the present disclosure.

For a three-bonded channel frame, such as the three-bonded channel WB-SC or OFDM frame, the corners 1, 2, 3, and 4 of the spectrum mask are ±3.1 GHz from center frequency (fc) at substantially 0 dBc relative power, ±3.6 GHz from center frequency (fc) at substantially −17 dBc relative power, ±8.1 GHz from center frequency (fc) at substantially −22 dBc relative power, and ±9.18 GHz from center frequency (fc) at substantially −30 dBc. FIG. 12D illustrates a graph of the exemplary spectrum mask applied to a three-bonded channel frame.

Figure 12E:
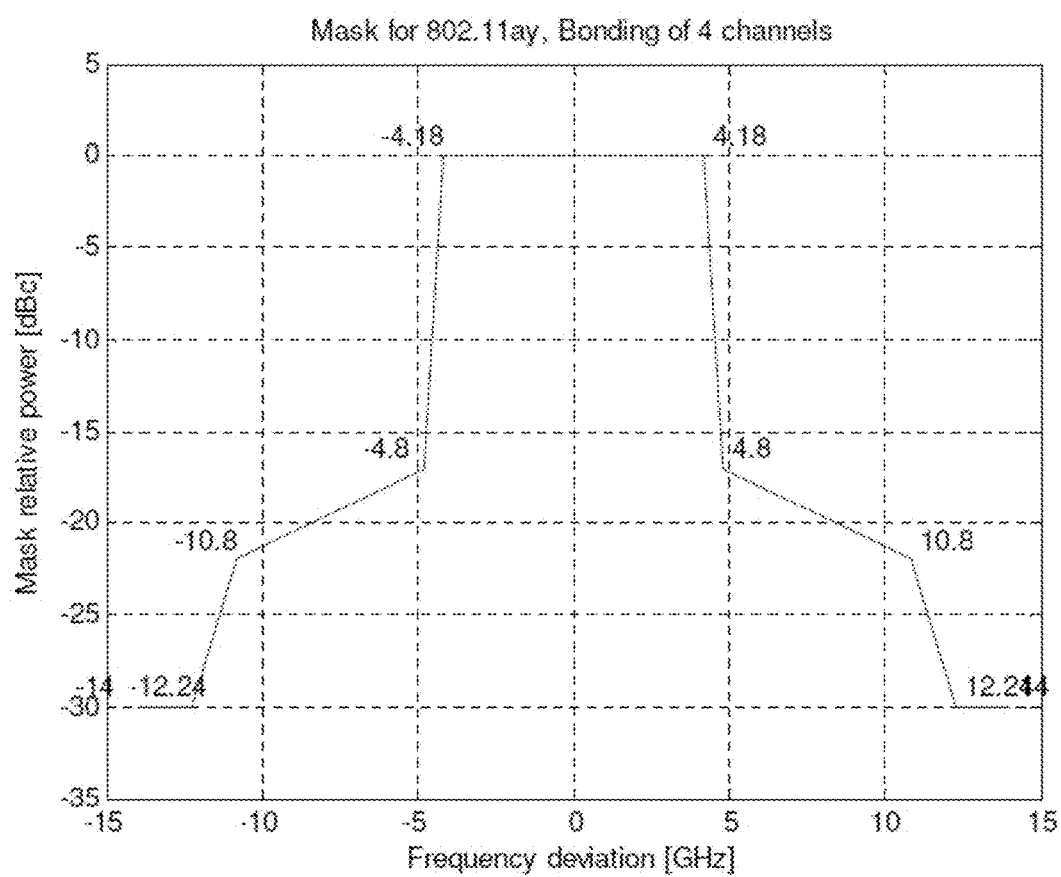
FIG. 12E illustrates a graph of an exemplary spectrum mask applied to a four-bonded channel frame in accordance with another aspect of the present disclosure.
Figure 13A:
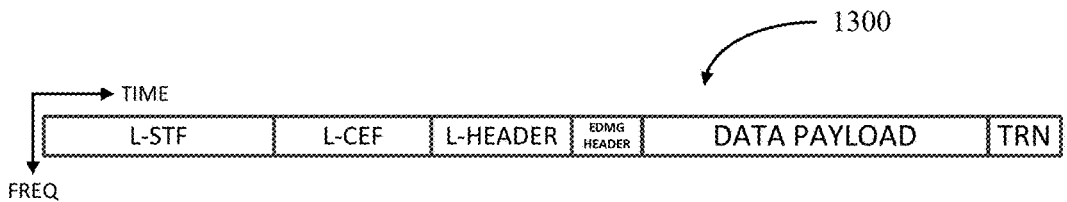
FIGS. 13A-13D illustrate exemplary frames for transmission of data via an aggregate (adjacent channel)single carrier (SC) transmission mode in accordance with certain aspects of the present disclosure.
Figure 13B:
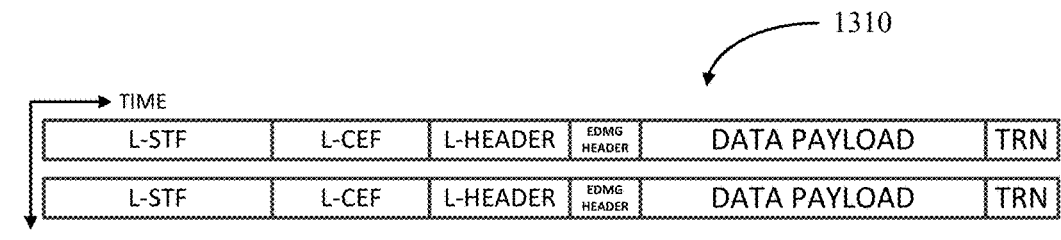
Figure 13C:
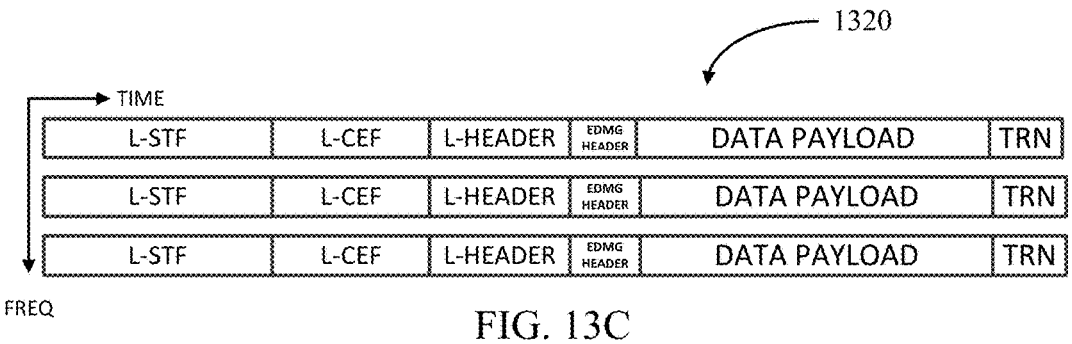
Figure 13D:
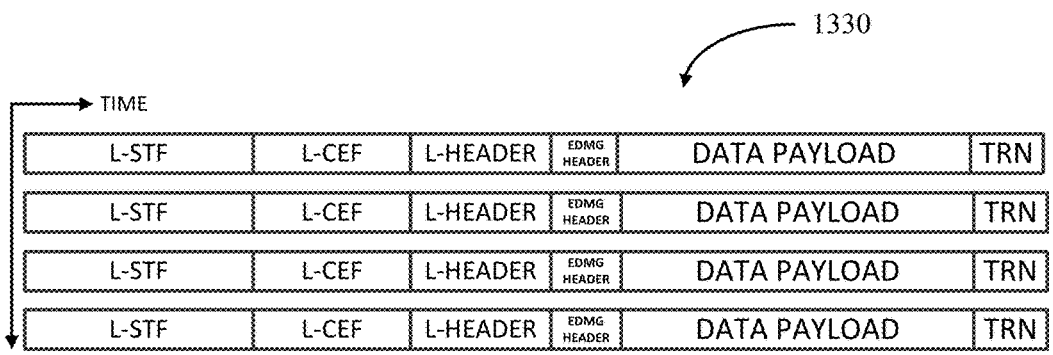

For a four-bonded channel frame, such as the three-bonded channel WB-SC or OFDM frame, the corners 1, 2, 3, and 4 of the spectrum mask are ±4.18 GHz from center frequency (fc) at substantially 0 dBc relative power, ±4.8 GHz from center frequency (fc) at substantially −17 dBc relative power, ±10.8 GHz from center frequency (fc) at substantially −22 dBc relative power, and ±12.24 GHz from center frequency (fc) at substantially −30 dBc. FIG. 12E illustrates a graph of the exemplary spectrum mask applied to a four-bonded channel frame.

FIGS. 13A-13D illustrate exemplary frames 1300, 1310, 1320, and 1330 for transmission of an aggregate (adjacent channel) single carrier (SC) transmission mode in accordance with an aspect of the disclosure. The frames 1300, 1310, 1320, and 1330 have been described in detail in the '479 Provisional Application. To summarize, transmission in aggregate mode is an aggregation of legacy 802.11ad channels. Since the 802.11ay extends the modes of the 802.11ad, there is a need for EDMG HEADER bits. The data in the DATA PAYLOAD of each of these frames 1300, 1310, 1320, and 1330 may be encoded and modulated per any of the MCSs depicted in the table of FIG. 5. Each of the data (FFT) block in the DATA PAYLOAD may use the long, normal, or short GI, as indicated in FIGS. 4A-4B.

The frame formats for both aggregate SC and WB-SC (as discussed further herein) are similar in their first sections (L-STF, L-CEF, L-HEADER and EDMG HEADER), and different for the rest of the transmission. The similar part is kept the same since it is backward compatible with 802.11ad for the backward compatibility feature. It means that legacy (802.11ad) devices will be able to detect it and decode the L-HEADER. As previously discussed, this feature allows legacy devices to update the NAV, which is part of the collision avoidance method. Furthermore, in channel bonded (CB) mode, the L-STF, L-CEF, and L-HEADER are transmitted on all used channels to facilitate legacy devices on all channels to get the NAV.

The legacy (L-STF+L-CEF+L-HEADER) and the EDMG HEADER should be transmitted with the same power across aggregated channels. However, due to RF impairments, actual effective isotropic radiated power (EIRP) may differ. The 802.11ay additional header, aka "EDMG HEADER" is also transmitted in the 802.11ad channels. As previously discussed, the EDMG HEADER includes information that is part of the 802.11ay transmission only and also 802.11ay Payload Data is appended to the same symbol. The following considerations apply: (1) The legacy L-STF and L-CEF apply (no need for additional CEF); (2) Modulation and coding as defined in the L-HEADER for 802.11ad Data; (3) Data appended to same symbol to improve overhead for short messages; (4) Data is split across channels in CB mode to improve overhead; and (5) the average power should be kept the same (means that the power of L-STF, L-CEF, L-HEADER and EDMG HEADER are same) in each channel.

Frame 1300 is the extension of 802.11ay for a single channel case. It facilitates the new MCSs of 802.11ay for the 802.ay DATA PAYLOAD and optional TRN. Frame 1310 is the extension of 802.11ay for the two channel case (bonded in time, but not frequency). Frame 1320 is the extension of 802.11ay for a three channel case (bonded in time, but not frequency). And, Frame 1330 is the extension of 802.11ay for four channel case (bonded in time, but not frequency). The EDMG HEADER and attached Data are same as described for the SC WB mode, except that there are no Power difference bit, they are added to the "Reserved bits".

There are three implementation options for the aggregate SC: (1) Each channel is independent; (2) all channels are mixed; and (3) all channels are transmitted in parallel. In this first option, each channel is independent. The MCS for the 802.11ay section can be different in each channel. The LDPC blocks are confined to one channel, and each channel has its own blocks. Transmitter may assign different power per channel, but the power shall be fixed for the entire transmission. In this case, the EDMG HEADER can be different in each channel (e.g., different MCS per channel).

In the second option, all channels are bonded and mixed. The MCS for the 802.11ay section is the same for all channels. The LDPC blocks are spread evenly between the channels. Transmitter may (and should) assign different power per channel for even detection probability of each channel, but the power shall be fixed during the entire transmission. In this option, the EDMG HEADER will be same in each channel.

In the third option, the MCS for transmitting data in the DATA PAYLOAD is the same for all aggregate channels. However, each channel has independent encoded (e.g., LDPC) blocks. Each channel is similar and operates in parallel. The transmitter may (and should) assign different power per channel for even detection probability of each channel, but the power shall be fixed during the entire transmission. The transmitter fills the LDPC blocks one by one sequentially keeping the channel load event. The last LDPC block in some channels (but not all) can be filled with padding. In this option, the EDMG HEADER will be same in each channel.

Another transmission mode that is similar to aggregate-SC is duplicate-SC. More specifically, in duplicate-SC, the transmission of the aggregate channels is the same as third transmission option of the aggregate-SC with the special restriction that the same data is transmitted in all channels. In other words, each channel is an exact "copy" of the other channel.

Frame 1300 may be transmitted via any one of the four (4) available channels CH1, CH2, CH3, and CH4. Frame 1310 may be transmitted via any two adjacent channels among the four (4) available channels CH1-CH2, CH2-CH3, or CH3-CH4. Frame 1320 may be transmitted via any three adjacent channels among the four (4) available channels CH1-CH2-CH3 or CH2-CH3-CH4. It follows that frame 1330 is transmitted via all available four (4) channels CH1-CH2-CH3-CH4. Although, in this example, there are four (4) available channels (for backwards compatibility with the legacy 802.11ad), it shall be understood that more than four (4) channels may be available for transmission of a multi-channel frame.

Figure 14A:
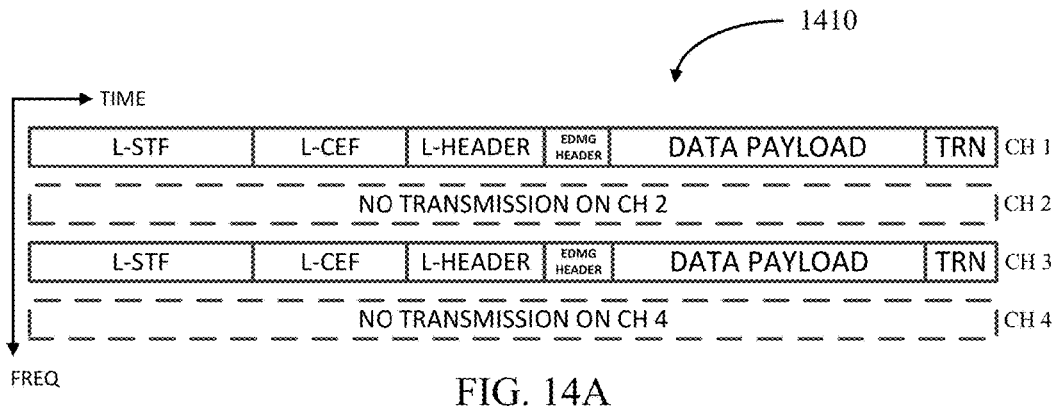
FIGS. 14A-14E illustrate exemplary frames for transmission of data via aggregate (non-adjacent channel) single carrier (SC) transmission mode in accordance with certain aspects of the present disclosure.
Figure 14B:
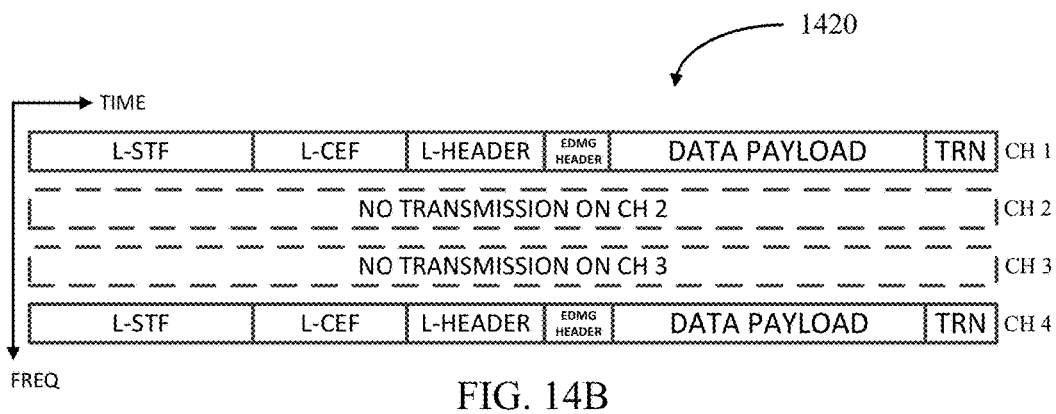
Figure 14C:
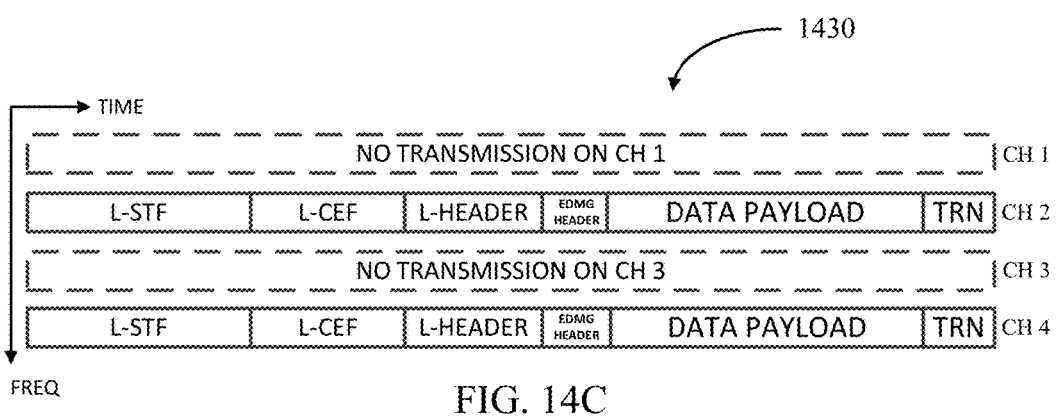

FIGS. 14A-14C illustrate exemplary frames 1410, 1420, and 1430 for transmission in a two aggregate (non-adjacent channel) single carrier (SC) transmission mode in accordance with an aspect of the disclosure. Frame 1410 is an example of a transmission via non-adjacent channels CH1 and CH3 with no transmission via channels CH2 and CH4. Frame 1420 is an example of a transmission via non-adjacent channels CH1 and CH4 with no transmission via channels CH2 and CH3. And, frame 1430 is an example of a transmission via non-adjacent channels CH2 and CH4 with no transmission via channels CH1 and CH3.

Figure 14D:
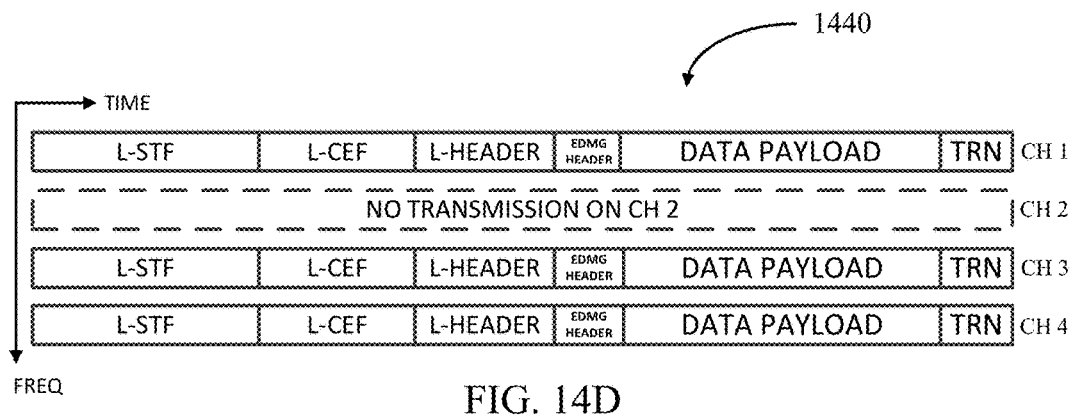
Figure 14E:
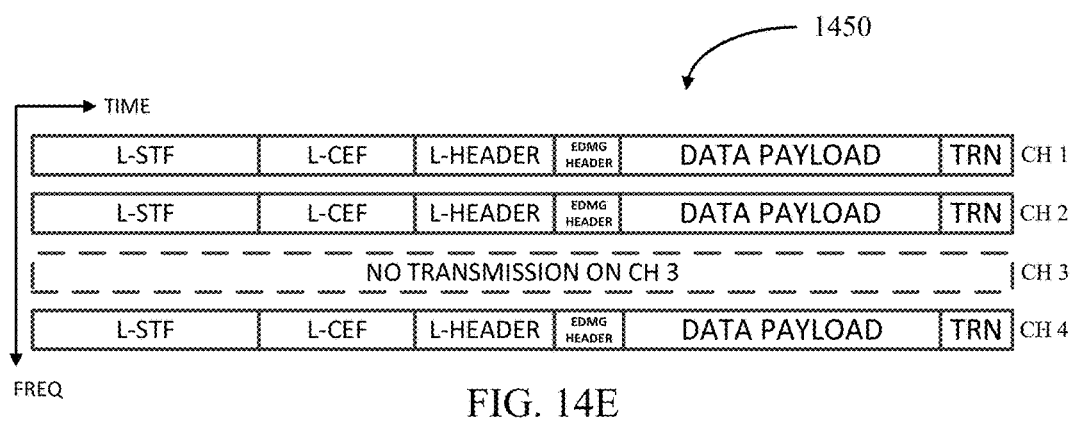

FIGS. 14D-14E illustrate exemplary frames 1440 and 1450 for transmission via three aggregate (a pair of adjacent channels and one non-adjacent channel) single carrier (SC) transmission mode in accordance with an aspect of the disclosure. Frame 1440 is an example of a transmission via non-adjacent channel CH1 and adjacent channels CH3-CH4 with no transmission via channel CH2. Frame 1450 is an example of a transmission via adjacent channels CH1-CH2 and non-adjacent channel CH4 with no transmission via channel CH3.

Figure 15A:
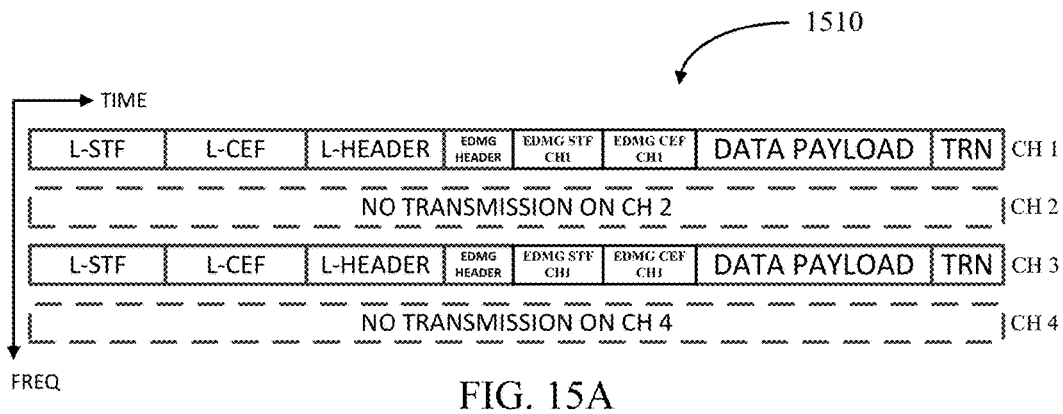
FIGS. 15A-15C illustrate exemplary frames for transmission of data via aggregate (non-adjacent channel) orthogonal frequency division multiplexing (OFDM) transmission mode in accordance with certain aspects of the present disclosure.
Figure 15B:
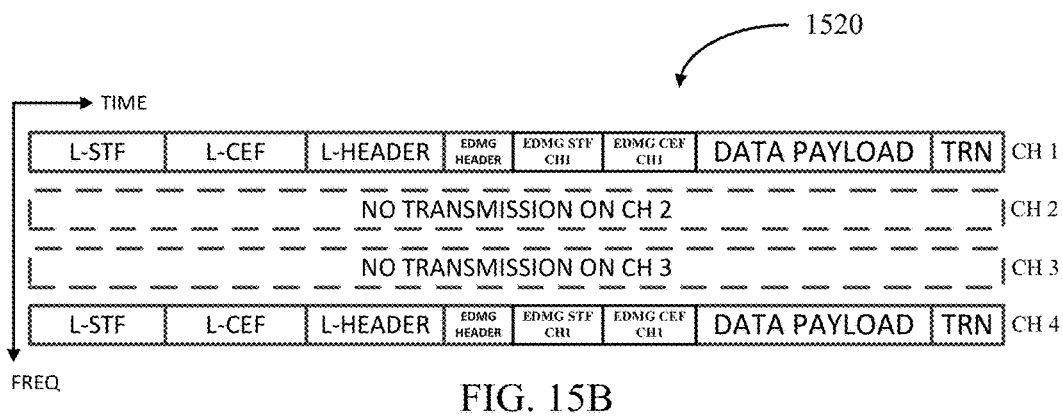
Figure 15C:
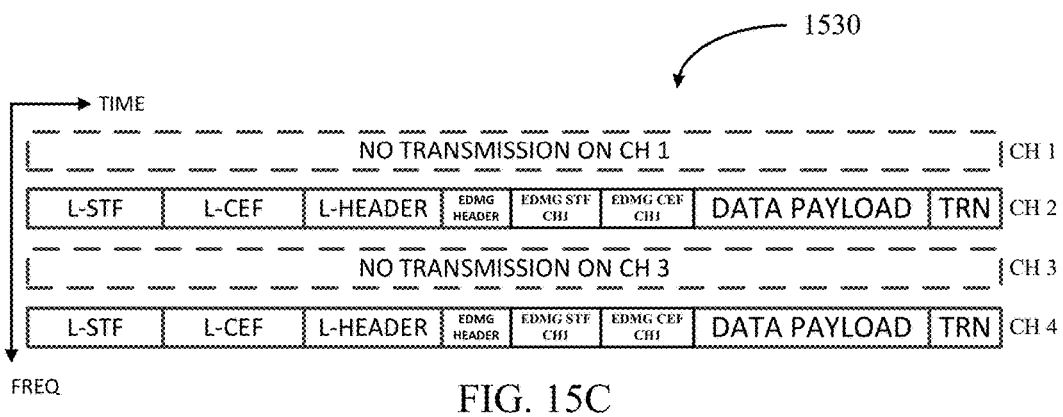

FIGS. 15A-15C illustrate exemplary frames 1510, 1520, and 1530 for transmission in an orthogonal frequency division multiplexing (OFDM) transmission mode in accordance with an aspect of the disclosure. Each of the OFDM frames 1510, 1520, and 1530 should maintain the legacy 802.11ad preamble (L-STF and L-CEF) and L-HEADER as prefix in order to be backwards compliant. In addition, these OFDM frames are usually transmitted with some backoff to reduce peak to average power ratio (PARP), which needs to be applied to the legacy preambles themselves.

In this example, frame 1510 is an example of a two channel aggregate (non-adjacent) OFDM frame in accordance with the proposed new protocol (802.11ay). The frame 1510 comprises a first channel (CH1) transmission including the legacy portion L-STF, L-CEF, and the L-HEADER, and the proposed new protocol portion EDMG HEADER with the optional attached data, EDMG STF, EDMG CEF, DATA PAYLOAD, and optional TRN. The first channel (CH1) has a bandwidth of substantially 1.76 GHz. The frame 1510 further comprises a third channel (CH3) transmission including the legacy portion -STF, L-CEF, and the L-HEADER, and the proposed new protocol portion EDMG HEADER with the optional attached data, EDMG STF, EDMG CEF, DATA PAYLOAD, and optional TRN. The transmission of the legacy preamble and header in the first and third channels (CH1 and CH33) are for 802.11ad backward compatibility. The data attached to the EDMG HEADER for the first channel (CH1) may be different than the data attached to the EDMG HEADER of the third channel (CH3). The third channel (CH3) also has a bandwidth of 1.76 GHz. Frame 1510 does not include transmissions via channels CH2 and CH4.

Frame 1520 is an example of a two channel aggregate (non-adjacent) OFDM frame in accordance with the proposed new protocol (802.11ay). Similar to frame 1510, the frame 1520 comprises a first channel (CH1) transmission including the legacy portion L-STF, L-CEF, and the L-HEADER, and the proposed new protocol portion EDMG HEADER with the optional attached data, EDMG STF, EDMG CEF, DATA PAYLOAD, and optional TRN. The frame 1520 further comprises a fourth channel (CH4) transmission including the legacy portion -STF, L-CEF, and the L-HEADER, and the proposed new protocol portion EDMG HEADER with the optional attached data, EDMG STF, EDMG CEF, DATA PAYLOAD, and optional TRN. Frame 1520 does not include transmissions via channels CH2 and CH3.

Frame 1530 is an example of a two channel aggregate (non-adjacent) OFDM frame in accordance with the proposed new protocol (802.11ay). Similar to frames 1510 and 1520, the frame 1530 comprises a second channel (CH2) transmission including the legacy portion L-STF, L-CEF, and the L-HEADER, and the proposed new protocol portion EDMG HEADER with the optional attached data, EDMG STF, EDMG CEF, DATA PAYLOAD, and optional TRN. The frame 1530 further comprises a fourth channel (CH4) transmission including the legacy portion -STF, L-CEF, and the L-HEADER, and the proposed new protocol portion EDMG HEADER with the optional attached data, EDMG STF, EDMG CEF, DATA PAYLOAD, and optional TRN. Frame 1530 does not include transmissions via channels CH1 and CH3.

Although in the exemplary frames 1510, 1520, and 1530, the transmission are via non-adjacent channels, it shall be understood that OFDM transmission mode frames may be transmitted via adjacent channels similar to aggregate-SC frames 1300-1330. A difference between an aggregate OFDM frame and an aggregate-SC frame is that the OFDM frame includes the additional EDMG STF and EDMG CEF to assist a receiver in demodulating and decoding the data encoded and modulated with the MCS available per the proposed new protocol 802.11ay, but not available per the legacy protocol 802.11ad. Additionally, the adjacent and non-adjacent aggregate OFDM frames may be used for multiple-access, where each of the channels is assigned to a different user.

Figure 15D:
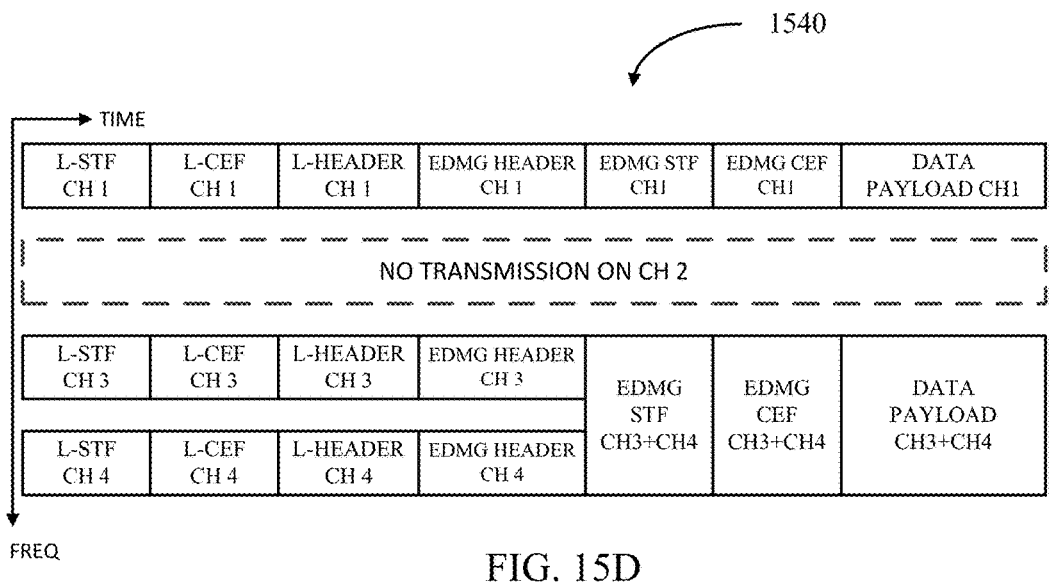
FIGS. 15D-15E illustrate frames for transmission in an orthogonal frequency division multiplexing (OFDM) transmission mode in accordance with another aspect of the disclosure.
Figure 15E:
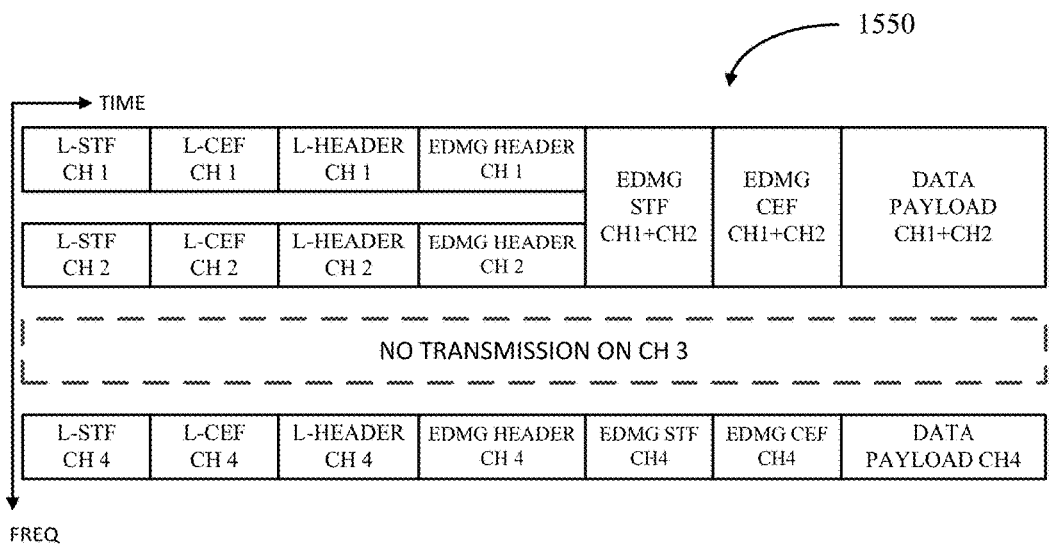

FIGS. 15D-15E illustrate frames 1540 and 1550 for transmission in an orthogonal frequency division multiplexing (OFDM) transmission mode in accordance with an aspect of the disclosure. Each of these frames 1540 and 1550 include a transmission via a bonded channel and a non-adjacent single channel. For example, frame 1540 includes a first transmission via non-adjacent single channel CH1, and a second transmission via a bonded channel CH3+CH4. The frame 1540 includes no transmission via channel CH2. The bonded channel transmission includes time-aligned transmissions of the legacy portion (L-STF, L-CEF, and L-HEADER) and the EDMG HEADER via separate channels CH3-CH4. The bonded channel transmission includes the EDMG STF, EDMG CEF, and DATA PAYLOAD for transmission via frequency bonded channels CH3+CH4.

Similarly, frame 1550 includes a first transmission via a bonded channel CH1+CH2, and a second transmission via a single non-adjacent channel CH4. The frame 1550 includes no transmission via channel CH3. The bonded channel transmission includes time-aligned transmissions of the legacy portion (L-STF, L-CEF, and L-HEADER) and the EDMG HEADER via separate channels CH1-CH2. The bonded channel transmission includes the EDMG STF, EDMG CEF, and DATA PAYLOAD for transmission via frequency bonded channels CH1+CH2.

The EDMG HEADER for the OFDM frames 1510-1550 is essentially the same as the EDMG HEADER previously discussed, except that the Power difference field bits are indicated as reserved bits. This is because OFDM frame is transmitted with a substantially uniform average power throughout the duration of the frame. Although frames 1540 and 1550 each include a two bonded channel, it shall be understood that a frame may be configured in a similar manner to provide more than two bonded channels (e.g., such as three (3) or four (4) bonded channels).

Figure 16A:
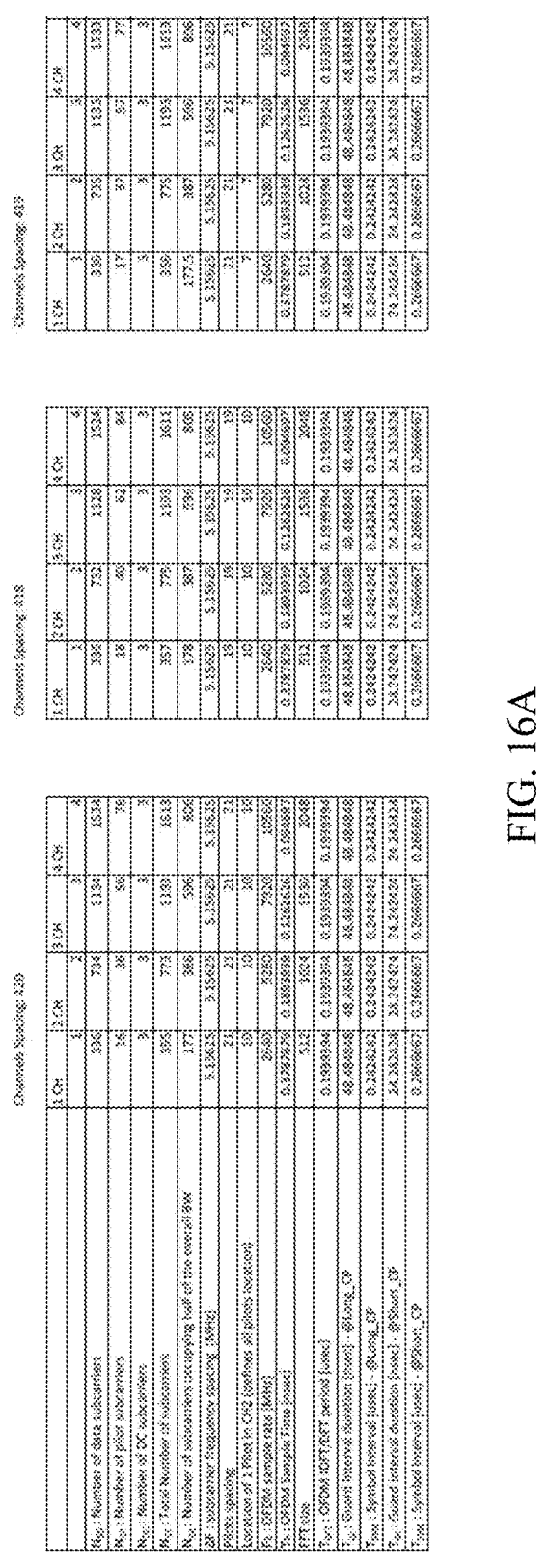

FIG. 16A illustrates a table of exemplary parameters for subcarriers of an OFDM signal in accordance with another aspect of the present disclosure. There are three (3) sections to the tables: (1) a first section including OFDM parameters for the case where the frequency gap between legacy (802.11ad) channels occupies 420 subcarriers of an OFDM transmission for a bonded channel that includes such legacy channels and the frequency gap; (2) a second section including OFDM parameters for the case where such frequency gap occupies 418 subcarriers of an OFDM transmission; and (3) a third section including OFDM parameters for the case where such frequency gap occupies 419 subcarriers of an OFDM transmission.

Each of the table sections includes four columns to indicate single-channel OFDM frame (1CH), two-bonded channel OFDM frame (2CH), three-bonded channel OFDM frame (3CH), and four-bonded channel OFDM frame (4CH).

The table further includes several rows for identifying parameters associated with the single-channel OFDM frame, two-bonded channel OFDM frame, three-bonded channel OFDM frame, and four-bonded channel OFDM frame for the three (3) cases. These parameters include $N_{SD}$: Number of data subcarriers; $N_{SP}$: Number of pilot subcarriers; $N_{DC}$: Number of DC subcarriers; $N_{ST}$: Total Number of subcarriers; $N_{SR}$: Number of subcarriers occupying half of the overall BW; $\Delta F$: subcarrier frequency spacing [MHz]; Pilot spacing; Location of 1 Pilot in CH2 (defines all pilot locations); $F_S$: OFDM sample rate (MHz); $T_S$: OFDM Sample Time [nanoseconds (nsec)]; data (FFT) block size; $T_{DFT}$: OFDM IDFT/DFT period [microsecond (usec)]; $T_{GI}$: Guard Interval duration [nsec]—@long_CP (cyclic prefix); $T_{SYM}$: Symbol Interval [usec]—@long_CP; $T_{GI}$: Guard Interval duration [nsec]—@Short_CP; and $T_{SYM}$: Symbol Interval [usec]—@Short_CP.

As indicated by the table, the number of data subcarriers $N_{SD}$ increases with the number of bonded channels for each of the channel spacing cases 420, 418, and 419. The number of pilot subcarriers $N_{SP}$ also increases with the number of bonded channels for each of the channel spacing cases 420, 418, and 419. The number of DC subcarriers $N_{DC}$ remains the same with the number of bonded channels and for all the channel spacing cases 420, 418, and 419. The total number of subcarriers $N_{ST}$ increases with the number of bonded channels for each of the channel spacing cases 420, 418, and 419.

As indicated by the table, the subcarrier frequency spacing $\Delta F$ is kept substantially the same (e.g., at 5.16 MHz) regardless whether the OFDM transmission is via a single-channel or bonded channels for all of the channel spacing cases 420, 418, and 419. The pilot subcarrier spacing remains fixed with the number of bonded channels for each of the channel spacing cases, but for channel spacing case 418 is it 19, whereas for channel spacing cases 420 and 419 it is 21. The location of the pilot channel that defines all pilot channels remains the same with the number of bonded channels, but for channel spacing cases 420 and 418 is it subcarrier 10, whereas for channel spacing case 419 it is subcarrier 7.

The OFDM sample rate Fs increases with the number of bonded channels and are respectively the same for all the channel spacing cases. The OFDM sample time Ts decreases with the number of bonded channels and are respectively the same for all the channel spacing cases. The data (FFT) block size increases with the number of bonded channels and are respectively the same for all the channel spacing cases. The OFDM IDFT/DFT period $T_{DFT}$ remains the same with the number of bonded channels and for all the channel spacing cases 420, 418, and 419.

The guard interval duration $T_{GI}$ for the long cyclic prefix (CP) remains the same with the number of bonded channels and for all the channel spacing cases 420, 418, and 419. The symbol interval $T_{SYS}$ for the long cyclic prefix (CP) remains the same with the number of bonded channels and for all the channel spacing cases 420, 418, and 419. The guard interval duration $T_{GI}$ for the short cyclic prefix (CP) remains the same with the number of bonded channels and for all the channel spacing cases 420, 418, and 419. And, the symbol interval $T_{SYS}$ for the short cyclic prefix (CP) remains the same with the number of bonded channels and for all the channel spacing cases 420, 418, and 419.

FIG. 16B illustrates a table of the pilot subcarrier assignments for the channel spacing case of 420 subcarriers. As indicated by the table, the pilot subcarrier assignments do not change for the corresponding single-channel case or bonded channel case. For instance, if the OFDM frame is transmitted via a single-channel (CB=1), such as legacy channel CH1, CH2, CH3, or CH4, the pilot subcarrier indices (e.g., −158 to +157) are the same as indicated in the corresponding columns of the table. Similarly, if the OFDM frame is transmitted via a two-bonded-channel (CB=2), such as legacy channels CH1-CH2, CH2-CH3, or CH3-CH4, the pilot subcarrier indices (e.g., −368 to +367) are the same as indicated in the corresponding columns of the table. If the OFDM frame is transmitted via a three-bonded-channel (CB=3), such as legacy channels CH1-CH2-CH3 or CH2-CH3-CH4, the pilot subcarrier indices (e.g., −578 to +577) are the same as indicated in the corresponding columns of the table. And, if the OFDM frame is transmitted via a four-bonded-channel (CB=4), such as legacy channels CH1-CH4, the pilot subcarrier indices range is from −788 to +787 as indicated in the corresponding columns of the table.

FIG. 16C illustrates a table of the pilot subcarrier assignments for the channel spacing case of 418 subcarriers. As indicated by the table, the pilot subcarrier assignments do not change for the corresponding single-channel case or bonded channel case. For instance, if the OFDM frame is transmitted via a single-channel (CB=1), such as legacy channel CH1, CH2, CH3, or CH4, the pilot subcarrier indices (e.g., −116 to +162) are the same as indicated in the corresponding columns of the table. Similarly, if the OFDM frame is transmitted via a two-bonded-channel (CB=2), such as legacy channels CH1-CH2, CH2-CH3, or CH3-CH4, the pilot subcarrier indices (e.g., −370 to +371) are the same as indicated in the corresponding columns of the table. If the OFDM frame is transmitted via a three-bonded-channel (CB=3), such as legacy channels CH1-CH2-CH3 or CH2-CH3-CH4, the pilot subcarrier indices (e.g., −579 to +580) are the same as indicated in the corresponding columns of the table. And, if the OFDM frame is transmitted via a four-bonded-channel (CB=4), such as legacy channels CH1-

CH4, the pilot subcarrier indices range is from −788 to +789 as indicated in the corresponding columns of the table.

FIG. 16D1 illustrates a table of the pilot subcarrier assignments for the channel spacing case of 419 subcarriers and a single channel transmission (CB=1). In contrast to the 420 and 418 channel spacing cases, the pilot subcarrier assignments change based on the particular legacy channel (CH1, CH2, CH3, or CH4) used for transmitting the OFDM frame. For instance, if the OFDM frame is transmitted via a channel CH1, the pilot subcarrier indices range from −162 to +174 as indicated in the corresponding columns of the table. If the OFDM frame is transmitted via a channel CH2, the pilot subcarrier indices range from −161 to +175 as indicated in the corresponding columns of the table. If the OFDM frame is transmitted via a channel CH3, the pilot subcarrier indices range from −160 to +176 as indicated in the corresponding columns of the table. If the OFDM frame is transmitted via a channel CH4, the pilot subcarrier indices range from −159 to +177 as indicated in the corresponding columns of the table.

FIG. 16D2 illustrates a table of the pilot subcarrier assignments for the channel spacing case of 419 subcarriers and a two-bonded-channel transmission (CB=2). Again, in contrast to the 420 and 418 channel spacing cases, the pilot subcarrier assignments change based on the particular bonded channel (CH1-CH2, CH2-CH3, or CH3-CH4) used for transmitting the OFDM frame. For instance, if the OFDM frame is transmitted via bonded channels CH1-CH2, the pilot subcarrier indices range from −372 to +384 as indicated in the corresponding columns of the table. If the OFDM frame is transmitted via bonded channels CH2-CH3, the pilot subcarrier indices range from −370 to +386 as indicated in the corresponding columns of the table. If the OFDM frame is transmitted via bonded channel CH3-CH4, the pilot subcarrier indices range is from −379 to +387 as indicated in the corresponding columns of the table.

FIG. 16D3 illustrates a table of the pilot subcarrier assignments for the channel spacing case of 419 subcarriers and a three-bonded-channel transmission (CB=3). Again, in contrast to the 420 and 418 channel spacing cases, the pilot subcarrier assignments change based on the particular bonded channel (CH1 -CH2-CH3, or CH2-CH3-CH4) used for transmitting the OFDM frame. For instance, if the OFDM frame is transmitted via bonded channels CH1-CH2-CH3, the pilot subcarrier indices range from −581 to +595 as indicated in the corresponding columns of the table. If the OFDM frame is transmitted via bonded channels CH2-CH3-CH4, the pilot subcarrier indices range is from −580 to +596 as indicated in the corresponding columns of the table.

FIG. 16D4 illustrates a table of the pilot subcarrier assignments for the channel spacing case of 419 subcarriers and a four-bonded-channel transmission (CB=4). For the case where the OFDM frame is transmitted via bonded channels CH1-CH2-CH3-CH4, the pilot subcarrier indices range is from −790 to +806 as indicated in the corresponding columns of the table.

Figure 16E:
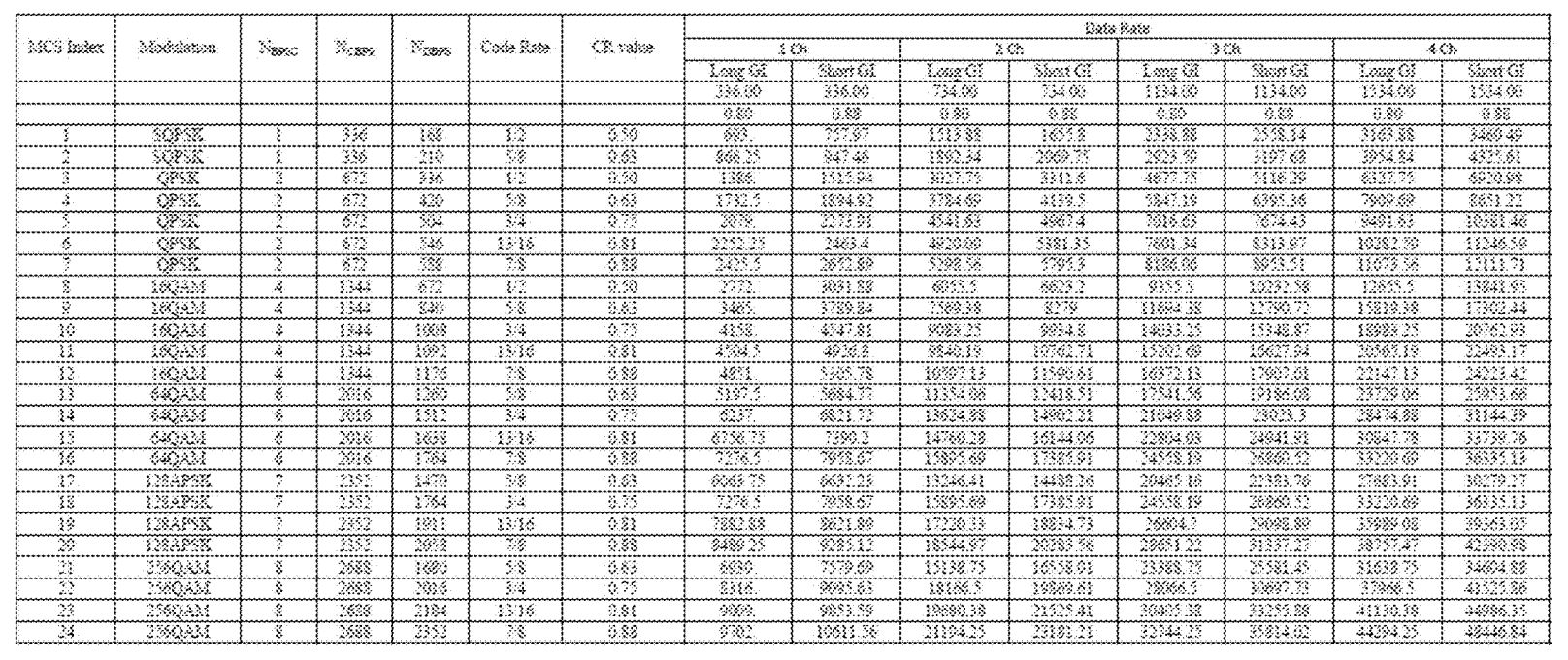

FIG. 16E illustrates a table depicting parameters of exemplary modulation coding schemes (MCS) for transmitting data via an orthogonal frequency division multiplexing (OFDM) transmission mode in accordance with another aspect of the present disclosure. The table depicted in FIG. 16E has a similar structure as the table depicted in FIG. 5 pertaining to the aggregate and WB-SC frames.

There are 24 MCS for the OFDM transmission mode. In particular, MCS1-24 are as follows: (1) staggered QPSK (SQPSK) with a ½ code rate, (2) SQPSK with a ⅝ code rate, (3) QPSK with a ½ code rate, (4) QPSK with a ⅝ code rate, (5) QPSK with a ¾ code rate, (6) QPSK with a ¹³⁄₁₆ code rate, (7) QPSK with a ⅞ code rate, (8) 16QAM with a ½ code rate, (9) 16QAM with a ⅝ code rate, (10) 16QAM with a ¾ code rate, (11) 16QAM with a ¹³⁄₁₆ code rate, (12) 16QAM with a ⅞ code rate, (13) 64QAM with a ⅝ code rate, (14) 64QAM with a ¾ code rate, (15) 64QAM with a ¹³⁄₁₆ code rate, (16) 64QAM with a ⅞ code rate, (17) 128APSK with a ⅝ code rate, (18) 128APSK with a ¾ code rate, (19) 128APSK with a ¹³⁄₁₆ code rate, (20) 128APSK with a ⅞ code rate, (21) 256QAM with a ⅝ code rate, (22) 256QAM with a ¾ code rate, (23) 256QAM with a ¹³⁄₁₆ code rate, and (24) 256QAM with a ⅞ code rate.

MCS1-5, 8-11, and 13-15 for a single channel and a long GI are the same for the 802.11ad OFDM frame. MCS1-5, 8-11, and 13-15 for a single channel and a short GI are only available for transmission of data in the OFDM frame according to the proposed new protocol (e.g., 802.11ay). Additionally, MCS1-5, 8-11, and 13-15 for all bonded channels are only available for transmission of data in the OFDM frame according to the proposed new protocol (e.g., 802.11ay). Further, the MCS 6-7, 12, and 16-24 for all channels (single or bonded) and long and short GIs are only available for transmission of data in the OFDM frame according to the proposed new protocol (e.g., 802.11ay).

The 128APSK and 256QAM modulations in accordance with MCS17-24 may be configured as depicted and described with reference to FIGS. 9A-9B and FIG. 10, respectively. The table depicted in FIG. 16E shows the data rates associated with MCS1-24.

Figure 17:
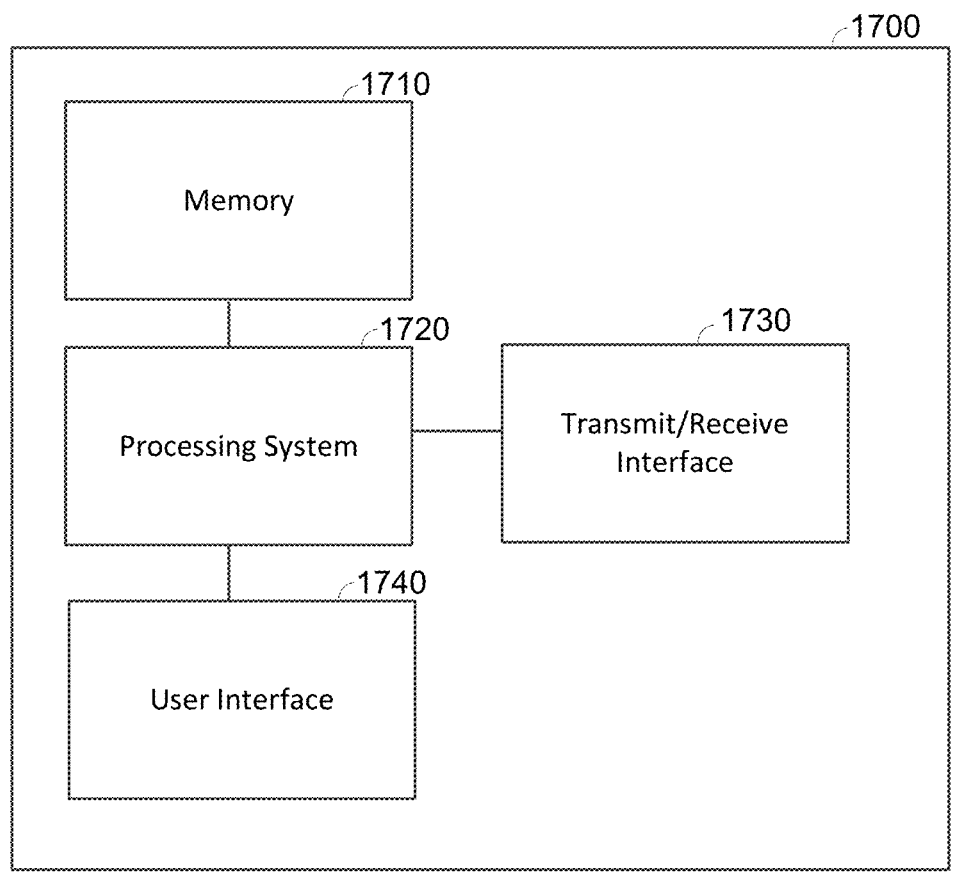
FIG. 17 is a block diagram illustrating a device in accordance with certain aspects of the present disclosure.

FIG. 17 illustrates an example device 1700 according to certain aspects of the present disclosure. The device 1700 may be configured to operate in an access point (e.g., access point 110) or an access terminal (e.g., access terminal) and to perform one or more of the operations described herein. The device 1700 includes a processing system 1720, and a memory 1710 coupled to the processor system 1720. The memory 1710 may store instructions that, when executed by the processing system 1720, cause the processing system 1720 to perform one or more of the operations described herein. Exemplary implementations of the processing system 1720 are provided below. The device 1700 also comprises a transmit/receiver interface 1730 coupled to the processing system 1720. The interface 1730 (e.g., interface bus) may be configured to interface the processing system 1720 to a radio frequency (RF) front end (e.g., transceiver 226 or 266), as discussed further below.

In certain aspects, the processing system 1720 may include a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1720 may generate a frame and output the frame to an RF front end (e.g., transceiver 226 or 266) via the interface 1730 for wireless transmission (e.g., to an access point or an access terminal).

In certain aspects, the processing system 1720 may include a receive processor (e.g., receive processor 242 or 282), a receive data processor (e.g., receive data processor 244 or 284) and/or a controller (e.g., controller 234 or 274) for performing one or more of the operations described herein. In these aspects, the processing system 1720 may receive a frame from an RF front end (e.g., transceiver 226 or 266) via the interface 1730 and process the frame according to any one or more of the aspects discussed above.

In the case of an access terminal 120, the device 1700 may include a user interface 1040 coupled to the processing system 1720. The user interface 1740 may be configured to receive data from a user (e.g., via keypad, mouse, joystick, etc.) and provide the data to the processing system 1740. The user interface 1740 may also be configured to output data from the processing system 1740 to the user (e.g., via a display, speaker, etc.). In this case, the data may undergo additional processing before being output to the user. In the case of an access point 110, the user interface 1740 may be omitted.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For instance, some examples of means for generating a frame include the frame builders 222 and 262 and the processing system 1720. Some examples of means for outputting the frame for transmission includes the transmit processors 224 and 264 and the transmit/receive interface 1730. Some examples of means for generating the frame for transmission via a single channel include the frame builders 222 and 262 and the processing system 1720. Some examples of means for generating the data payload of the frame for transmission via a plurality of bonded channels include the frame builders 222 and 262 and the processing system 1720.

Some examples of means for encoding and modulating the data payload with one of a first set of MCS according to the first protocol include the transmit data processors 220 and 260 and the processing system 1720. Some examples of means for encoding and modulating the header with one of a second set of modulation coding schemes (MCS) according to the second protocol include transmit data processors 220 and 260 and the processing system 1720.

Some examples of means for generating the data payload of the frame for transmission via a plurality of bonded channels include the frame builders 222 and 262 and the processing system 1720. Some examples of means for applying a spectrum mask to the frame include the transmit processors 224 and 262 and the processing system 1720. Some examples of means for outputting the masked frame include the transmit processors 224 and 264 and the transmit/receive interface 1730. Some examples of means for generating the frame for transmission via a plurality of channels bonded in time but separated in frequency include the frame builders 222 and 262 and the processing system 1720. Some examples of means for outputting the frame for transmission via the at least two of the plurality of the channels and no transmission via the at least another channel include the transmit processors 224 and 264 and the transmit/receive interface 1730.

Some examples of means for generating the frame for transmission via a plurality of orthogonal frequency division multiplexing (OFDM) bonded channels include the frame builders 222 and 262 and the processing system 1720. Some examples of means for generating the frame for transmission via a plurality of orthogonal frequency division multiplexing (OFDM) bonded channels or a single OFDM channel include the frame builders 222 and 262 and the processing system 1720.

Some examples of means for generating the frame for transmission via a bonded channel and a single channel include the frame builders 222 and 262 and the processing system 1720. Some examples of means for outputting the frame for transmission via the bonded channel and the single channel and no transmission via the at least another channel include the transmit processors 224 and 264 and the transmit/receive interface 1730.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol, wherein the encoded and modulated data payload comprises at least one data block, and wherein each of the at least one data block comprises a plurality of data symbols and a first guard interval comprising a sequence of symbols known to the first device; and
    an interface configured to output the frame for transmission via a single channel.

2. The apparatus of claim 1, wherein a number of sequence symbols in the first guard interval is different than a number of sequence symbols specified according to the second protocol.

3. The apparatus of claim 2, wherein the number of sequence symbols is 32 or 128.

4. The apparatus of claim 1, further comprising at least one antenna, wherein the interface is configured to output the frame for transmission via the at least one antenna, and wherein the apparatus is configured as a wireless node.

5. An apparatus for wireless communications, comprising:
    a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol, wherein the encoded and modulated data payload comprises at least one data block, and wherein each of the at least one data block comprises a plurality of data symbols and a guard interval comprising a sequence of symbols known to the first device; and
    an interface configured to output the frame for transmission via a plurality of bonded channels.

6. The apparatus of claim 5, wherein a number of the sequence symbols is a function of a number of bonded channels.

7. The apparatus of claim 6, wherein the number of bonded channels is two, and the number of sequence symbols in the guard interval is 256, 128 or 64.

8. The apparatus of claim 6, wherein the number of bonded channels is three, and the number of sequence symbols in the guard interval is 384, 192 or 96.

9. The apparatus of claim 6, wherein the number of bonded channels is four, and the number of sequence symbols in the guard interval is 512, 256 or 128.

10. The apparatus of claim 5, wherein a number of the data symbols in each of the at least one data block is a function of a number of bonded channels.

11. The apparatus of claim 10, wherein the number of bonded channels is two, and the number of data symbols in each of the at least on data block is 768, 896 or 960.

12. The apparatus of claim 10, wherein the number of bonded channels is three, and the number of data symbols in each of the at least on data block is 1152, 1344 or 1440.

13. The apparatus of claim 10, wherein the number of bonded channels is four, and the number of data symbols in each of the at least on data block is 1536, 1792 or 1920.

14. The apparatus of claim 5, further comprising at least one antenna, wherein the interface is configured to output the frame for transmission via the at least one antenna, and wherein the apparatus is configured as a wireless node.

15. An apparatus for wireless communications, comprising:
    a processing system configured to generate a frame comprising a preamble, a header, and a data payload, wherein the preamble, the header, and the data payload are decodable by a first device when operating according to a first protocol, wherein the preamble and the header are decodable by a second device when operating according to a second protocol, the data payload not being decodable by the second device when operating according to the second protocol, wherein the processing system is configured to encode and modulate the data payload with one of a first set of MCS according to the first protocol, wherein the processing system is configured to encode and modulate the header with one of a second set of modulation coding schemes (MCS) according to the second protocol, and wherein the first set of MCS is different than the second set of MCS; and
    an interface configured to output the frame for transmission.

16. The apparatus of claim 15, wherein the first set of MCS comprises at least one of 64QAM, 64APSK, 128APSK, 256QAM, or 256APSK and is not a subset of the second set of MCS.

17. The apparatus of claim 15, wherein the first set of MCS comprises at least one of π/2-QPSK with 7/8 code rate, π/2-16QAM with a 13/16 code rate, π/2-16QAM with a 7/8 code rate, π/2-64QAM with a 5/8 code rate, π/2-64QAM with a 3/4 code rate, π/2-64QAM with a 13/16 code rate, π/2-64QAM with a 7/8 code rate, π/2-64APSK with a 5/8 code rate, π/2-64APSK with a 3/4 code rate, π/2-64APSK with a 13/16 code rate, π/2-64APSK with a 7/8 code rate, π/2-128APSK with a 3/4 code rate, π/2-128APSK with a 13/16 code rate, π/2-128APSK with a 7/8 code rate, π/2-256QAM with a 3/4 code rate, π/2-256QAM with a 13/16 code rate, π/2-256QAM with a 7/8 code rate, π/2-256APSK with a 3/4 code rate, π/2-256APSK with a 13/16 code rate, or π/2-256APSK with a 7/8 code rate and is not a subset of the second set of MCS.

18. The apparatus of claim 15, wherein the first set of MCS comprises π/2-BPSK with 1/2 code rate, π/2-BPSK with 5/8 code rate, π/2-BPSK with 3/4 code rate, π/2-BPSK with 13/16 code rate, π/2-QPSK with 1/2 code rate, π/2-QPSK with 5/8 code rate, π/2-QPSK with 3/4 code rate, π/2-QPSK with 13/16 code rate, π/2-QPSK with 7/8 code rate, π/2-16QAM with a 1/2 code rate, π/2-16QAM with a 5/8 code rate, π/2-16QAM with a 3/4 code rate, π/2-16QAM with a 13/16 code rate, π/2-16QAM with a 7/8 code rate, π/2-64QAM with a 5/8 code rate, π/2-64QAM with a 3/4 code rate, π/2-64QAM with a 13/16 code rate, π/2-64QAM with a 7/8 code rate, π/2-64APSK with a 5/8 code rate, π/2-64APSK with a 3/4 code rate, π/2-64APSK with a 13/16 code rate, π/2-64APSK with a 7/8 code rate, π/2-128APSK with a 3/4 code rate, π/2-128APSK with a 13/16 code rate, π/2-128APSK with a 7/8 code rate, π/2-256QAM with a 3/4 code rate, π/2-256QAM with a 13/16 code rate, π/2-256APSK with a 3/4 code rate, π/2-256APSK with a 13/16 code rate, or π/2-256APSK with a 7/8 code rate.

19. The apparatus of claim 15, further comprising at least one antenna, wherein the interface is configured to output the frame for transmission via the at least one antenna, and wherein the apparatus is configured as a wireless node.

20. An apparatus for wireless communications, comprising:
a processing system configured to generate a frame comprising a preamble, a header, and a data payload, wherein the preamble, the header, and the data payload are decodable by a first device when operating according to a first protocol, wherein the preamble and the header are decodable by a second device when operating according to the second protocol, the data payload not being decodable by the second device when operating according to the second protocol, wherein the processing system is configured to apply a spectrum mask to the frame, wherein the spectrum mask comprises corners that are a function of a number of bonded channels via which the frame is to be transmitted; and
an interface configured to output the frame for transmission.

21. The apparatus of claim 20, wherein the number of bonded channels is two, and wherein the corners comprise first corners that are respectively ±2.02 GHz from a center frequency of the bonded channels at 0 dBc relative power, second corners that are respectively ±2.4 GHz from the center frequency at −17 dBc relative power, third corners that are respectively ±5.4 GHz from the center frequency at −22 dBc relative power, and fourth corners that are respectively ±6.12 GHz from the center frequency at −30 dBc relative power.

22. The apparatus of claim 20, wherein the number of bonded channels is three, and wherein the corners comprise first corners that are respectively ±3.1 GHz from a center frequency of the bonded channels at 0 dBc relative power, second corners that are respectively ±3.6 GHz from the center frequency at −17 dBc relative power, third corners that are respectively ±8.1 GHz from the center frequency at −22 dBc relative power, and fourth corners that are respectively ±6.12 GHz from the center frequency at −30 dBc relative power.

23. The apparatus of claim 20, wherein the number of bonded channels is four, and wherein the corners comprise first corners that are respectively ±4.18 GHz from a center frequency of the bonded channels at 0 dBc relative power, second corners that are respectively ±4.8 GHz from the center frequency at −17 dBc relative power, third corners that are respectively ±10.8 GHz from the center frequency at −22 dBc relative power, and fourth corners that are respectively ±12.24 GHz from the center frequency at −30 dBc relative power.

24. The apparatus of claim 20, further comprising at least one antenna, wherein the interface is configured to output the frame for transmission via the at least one antenna, and wherein the apparatus is configured as a wireless node.

25. An apparatus for wireless communications, comprising:
a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol; and
an interface configured to output the frame for transmission via a plurality of channels bonded in time but separated in frequency, wherein at least two of the plurality of channels are separated in frequency by at least another channel available for transmission, and wherein the interface is configured to transmit the frame for transmission only via the at least two of the plurality of channels.

26. The apparatus of claim 25, further comprising at least one antenna, wherein the interface is configured to output the frame for transmission via the at least one antenna, and wherein the apparatus is configured as a wireless node.

27. An apparatus for wireless communications, comprising:
a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol; and
an interface configured to output the frame for transmission via a plurality of orthogonal frequency division multiplexing (OFDM) bonded channels, wherein a number of data subcarriers for transmitting the data payload is a function of a number of the OFDM bonded channels, wherein the number of data subcarriers is 732, 734, or 735 if the number of the OFDM bonded channels is two, wherein the number of data subcarriers is 1128, 1133, or 1134 if the number of the OFDM bonded channels is three, or wherein the number of data subcarriers is 1524, 1533, or 1534 if the number of the OFDM bonded channels is four.

28. The apparatus of claim 27, further comprising at least one antenna, wherein the interface is configured to output the frame for transmission via the at least one antenna, and wherein the apparatus is configured as a wireless node.

29. An apparatus for wireless communications, comprising:
a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol; and
an interface configured to output the frame for transmission via a plurality of orthogonal frequency division multiplexing (OFDM) bonded channels, and wherein a number of pilot subcarriers for transmitting pilot signals is a function of a number of the OFDM bonded channels.

30. The apparatus of claim 29, wherein the number of pilot subcarriers is 36, 37, or 40 if the number of the OFDM bonded channels is two.

31. The apparatus of claim 29, wherein the number of pilot subcarriers is 56, 57, or 62 if the number of the OFDM bonded channels is three.

32. The apparatus of claim 29, wherein the number of pilot subcarriers is 76, 77, or 84 if the number of the OFDM bonded channels is four.

33. The apparatus of claim 29, further comprising at least one antenna, wherein the interface is configured to output the frame for transmission via the at least one antenna, and wherein the apparatus is configured as a wireless node.

34. An apparatus for wireless communications, comprising:
a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol; and
an interface configured to output the frame for transmission via a plurality of orthogonal frequency division multiplexing (OFDM) bonded channels, wherein the plurality of OFDM bonded channels comprise two adjacent channels with a frequency gap therebetween as defined by the second protocol, and wherein a number of subcarriers within the frequency gap is 418, 419, or 420.

35. The apparatus of claim 34, further comprising at least one antenna, wherein the interface is configured to output the frame for transmission via the at least one antenna, and wherein the apparatus is configured as a wireless node.

36. An apparatus for wireless communications, comprising:
a processing system configured to generate a frame comprising a preamble, a header, and a data payload encoded and modulated with an modulation coding scheme (MCS), wherein the preamble, the header, and the encoded and modulated data payload are decodable by a first device when operating according to a first protocol, wherein the preamble and the header are decodable by a second device when operating according to a second protocol, the encoded and modulated data payload not being decodable by the second device when operating according to the second protocol; and
an interface configured to output the frame for transmission via a bonded channel and a single channel, wherein the bonded channel is separated in frequency from the single channel by at least another channel available for transmission, wherein the interface is configured to output the frame for transmission only via the bonded channel and the single channel.

37. The apparatus of claim 36, further comprising at least one antenna, wherein the interface is configured to output the frame for transmission via the at least one antenna, and wherein the apparatus is configured as a wireless node.

* * * * *